United States Patent [19]

Duyvesteyn

[11] Patent Number: 5,229,003
[45] Date of Patent: Jul. 20, 1993

[54] RECOVERY OF BASE MATERIALS FROM GEOTHERMAL BRINES

[75] Inventor: Willem P. C. Duyvesteyn, San Jose, Calif.

[73] Assignee: BHP Minerals International Inc., Sunnyvale, Calif.

[21] Appl. No.: 763,446

[22] Filed: Sep. 19, 1991

[51] Int. Cl.[5] .............................................. B01D 11/04
[52] U.S. Cl. ..................................... 210/638; 210/634
[58] Field of Search .............. 210/638, 767, 634, 688; 423/100, 109

[56] References Cited

U.S. PATENT DOCUMENTS 4,406,865  9/1983  Fuller ............................. 210/638 X
4,624,704  11/1986  Byeseda ........................ 423/100 X Primary Examiner—Frank Spear
Attorney, Agent, or Firm—Hopgood, Calimafde, Kalil, Blaustein & Judlowe

[57] ABSTRACT

A process is provided for the recovery of substantially pure zinc from geothermal brine also containing recoverable amounts of lead and silver. The process comprises selectively extracting lead and silver from the brine and then contacting the brine impoverished in lead and silver with a substantially insoluble organic extractant (e.g., an ion exchange resin [IX] or an organic solvent [SX]) selective to the extraction of zinc to produce a spent brine, and a zinc-loaded organic extractant. The zinc-loaded organic extractant is separated from the spent brine and the zinc-loaded extractant is contacted with an aqueous solution to remove the zinc as an aqueous zinc chloride solution. The pH of the zinc solution is adjusted, if necessary, to a level to condition the solution to promote the extraction thereof by a cationic organic solvent. The zinc is then extracted from the zinc-loaded aqueous solution using a cationic organic solvent (SX) or an ion exchange resin (IX) selective to the extraction of zinc, thereby producing a zinc-loaded cationic extractant which is separated from the aqueous solution. The zinc is then stripped from the zinc-loaded cationic extractant using an amount of sulfuric acid by volume sufficient to provide an electrolyte solution containing a concentration of zinc sufficient for the recovery thereof by electrowinning. Thus, the process may comprise an SX-SX, or an IX-SX, or an SX-IX or an IX-IX system.

54 Claims, 19 Drawing Sheets

RECOVERY OF BASE MATERIALS FROM GEOTHERMAL BRINES

BACKGROUND OF THE INVENTION

This invention relates to a process for recovering certain base metals from geothermal brines and, in particular, to the recovery of zinc, lead, silver and other precious metals, e.g., gold and platinum, as a by-product thereof.

STATE OF THE ART

Methods have been proposed for the recovery of metal values from brines. The term "brines" is used in the broad sense and includes, in addition to geothermal brines, brines obtained as waste or by-product steams characteristic of industrial processes. The foregoing brines generally contain substantial amounts of metal ions of commercial value.

Geothermal brines are of particular interest in that they have been and are used as a source of energy because of the amount of heat which prevail in subterranean pools of geothermal brines, particularly the large subterranean pools which exist in California.

In the late seventies and early eighties the Department of Energy sponsored a number of R and D programs to investigate the generation of geothermal power from Imperial Valley resources. One of the programs included was a budget of $20 million or more to investigate the potential of producing power from a very deep brine field in the Southern section of the Valley near Brawley which is called the Imperial Field. This resulted in the drilling of four wells in excess of 15,000 feet that were tested for an extended period of time. It appears that a CU-1 joint venture (a group interested in the production of electrical power from geothermal resources) responsible for the test program decided against the development of these deep resources because of various technical problems. One of the problems was associated with the formation of a heavy scale on the inside of the wellbore, which resulted in a premature decrease in the flow of brine. Although experience had been gained with solving scaling problems that occurred in shallower wells in the Northern section of the Valley, this scale had a different characteristic. The scaling was the result of the brine being supersaturated with lead and silver, with the CU-1 wellbore scales running about 80% lead and 10% silver.

Brine samples from these four wells showed zinc values that were 2 to 4 times higher than the ones experienced with existing geothermal brines from the Northern section of the Imperial Valley. No further work was done to solve the scaling problem or the problem of metal recovery and the programs were discontinued.

The Imperial Valley of California presently supports about half a dozen geothermal power plants with a total installed generating capacity of 250 MW. At present, four more plants are under construction which will increase this capacity by an additional 150 MW.

An analytical comparison of flashed brines from the Imperial Field and the Salton Sea Field in parts per million is given below:

| Element, ppm | Imperial Field | Salton Sea Level |
| --- | --- | --- |
| Gold | NA | 0.2 |
| Silver | 2.6 | 0.5 |
| Zinc | 1500 | 500 |
| Lead | 650 | 110 |
| Lithium | 250 | 280 |
| Strontium | 1500 | 620 |
| Manganese | 1000 | 1200 |
| Platinum | NA | 0.06 |
| Sodium | 50,000 | 57,000 |
| Calcium | 18,000 | 26,000 |
| Potassium | 10,000 | 15,000 |
| Iron | 3,200 | 1,800 |
| Barium | 2,000 | 600 |
| Boron | 220 | 360 |
| Chloride | 131,000 | 160,000 |

As will be noted, the chemical composition of brines from both fields is essentially the same, except for zinc, lead and silver.

The Salton Sea Field exhibits high salinity at a relatively shallow depth and contains approximately 28% dissolved solids; whereas, the Imperial Field, compared to the Salton Sea Field, has higher salinity and has dissolved solids of approximately by weight 32% at greater depths.

Various methods have been proposed for treating geothermal brines. Particular reference is made to U.S. Pat. No. 4,624,704 by J. J. Byeseda which is directed to the selective recovery of zinc from metal containing brine, the disclosure of which is incorporated herein by reference.

As stated in this patent, geothermal brines are of particular interest in that they provide a source of power by virtue of the fact that hot geothermal pools are stored under great pressure beneath the earth surface and which when released to atmospheric pressure provide flash-steam for running a power plant. In addition, the geothermal brine contain metal values as stated hereinbefore, especially lead, silver and zinc, zinc being predominant of the three elements.

The method proposed by the patent for recovering the zinc is to contact the brine in a single solvent extraction process with a quaternary amine salt dissolved in a water immiscible organic solvent. The particular amine referred to is a methyl triakyl ammonium chloride in which the alkyl group contains 8 to 10 carbon atoms.

The zinc is removed from the brine in the form of a zinc amine complex. The zinc-loaded organic solvent is then contacted with an aqueous solution of sodium sulfate to form a sulfated quaternary amine salt, while a substantial portion of the zinc in the zinc amine complex is stripped therefrom and transferred to the aqueous phase as a mixture of an aqueous zinc chloride and sodium sulfate solution which is separated from the solvent, the solvent being immiscible.

No attempt is made to selectively recover lead, silver or other precious metals.

Other methods are disclosed in the prior art for recovering metal values from postflash geothermal brines. In this connection reference is made to a publication appearing in Geothermal Resources Council, Transactions, Vol. 8, 9pp. 159-162), August, 1984. The publication based on work sponsored by the U.S. Bureau of Mines is entitled "Techniques For Recovering Metal Values From Postflash Geothermal Brines" by L. E. Schultze.

The main concern of this development is to produce substantially pure LiCl. The recovery of zinc and lead by sulfide or line precipitation is disclosed. The use of ion exchange to produce an impure $ZnCl_2$ is disclosed as another possibility.

Another method proposed for treating geothermal brines is that disclosed in Geothermal Resources Council, Transactions, Vol. 6 (pp. 111-113), October 1982. The article is entitled "Comparison of Methods For Recovering Metal Values From Salton Sea KGRA Brines" by L. E. Schultze and D. J. Bauer. The methods proposed in this article compare the use of lime precipitation with sulfide precipitation. It was concluded that the use of lime additions precipitated more than 95% of the iron, manganese, lead and zinc, while the use of sulfide additions precipitated more than 90% of the lead and zinc and lesser amounts of iron and manganese. Solvent extraction was not considered.

Other publications include Geothermal Resources Council, Transactions, Vol. 9, (pp. 233–237), Part II, August, 1985, entitled "Metal Recovery From Imperial Valley Hypersaline Brine" by J. J. Byeseda et al; Society of Mining Engineers of AIME, Annual Meeting, Las Vegas, Nev., Feb. 24-28, 1980, Preprint No. 80-98 entitled "Extraction Of Nonferrous Metals From High Salinity Geothermal Brine by Sulfide Precipitation", by R. W. Bartlett et al (sponsored by the U.S. Bureau of Mines; and U.S. Bureau of Mines Report of Investigations 8922 (1985) entitled "Recovery of Zinc-Lead Sulfide From A Geothermal Brine" by L. E. Schultze and D. J. Bauer).

Precipitation methods have their problems, particularly with the subsequent steps of separating the metal values from the co-precipitated product. Moreover, where lime precipitation is used to recover metal values, re-injection of the spent brine into geothermal formation is not advisable because of the high pH of the spent brine.

It would be desirable to provide a more simple and direct approach for recovering zinc along with lead and silver, that is, a method in which lead and silver are first selectively removed from the brine, followed by the extraction of zinc in a form amenable for recovery by electrolysis.

OBJECTS OF THE INVENTION

It is thus an object of the invention to provide an extraction process to recover zinc from brine containing other base metals involving two solvent extraction steps or alternatively using an ion exchange extractant step followed by a solvent extraction step.

Another object of the invention is to provide a solvent extraction process for recovering zinc from geothermal brines, wherein lead and silver and/or other precious metals contained in said brines are first selectively extracted from the brines before recovering the zinc.

These and other objects of the invention will be more clearly apparent from the following disclosure, the claims and the appended drawing.

IN THE DRAWING

Figure 6:
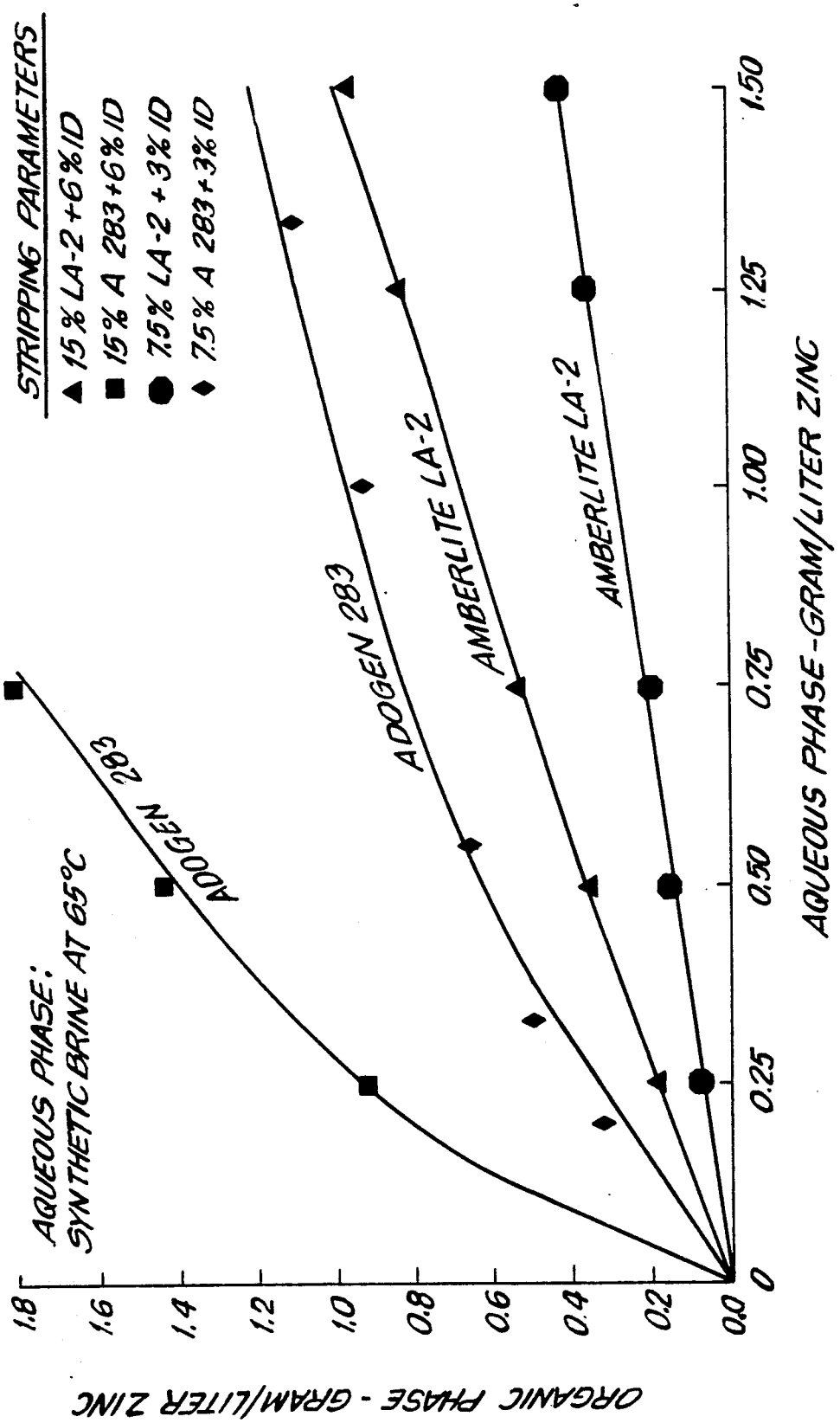
Figure 7:
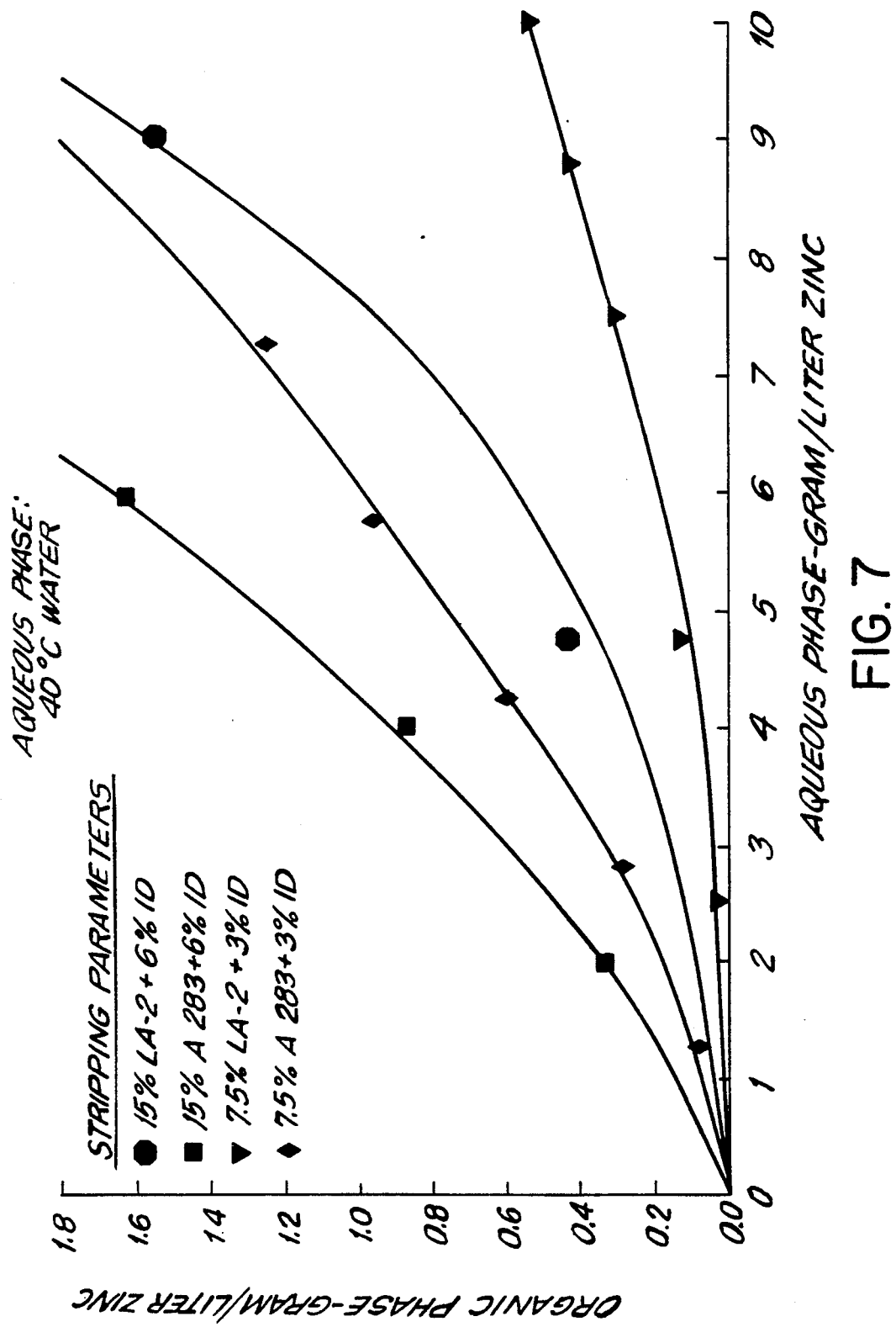
Figure 8:
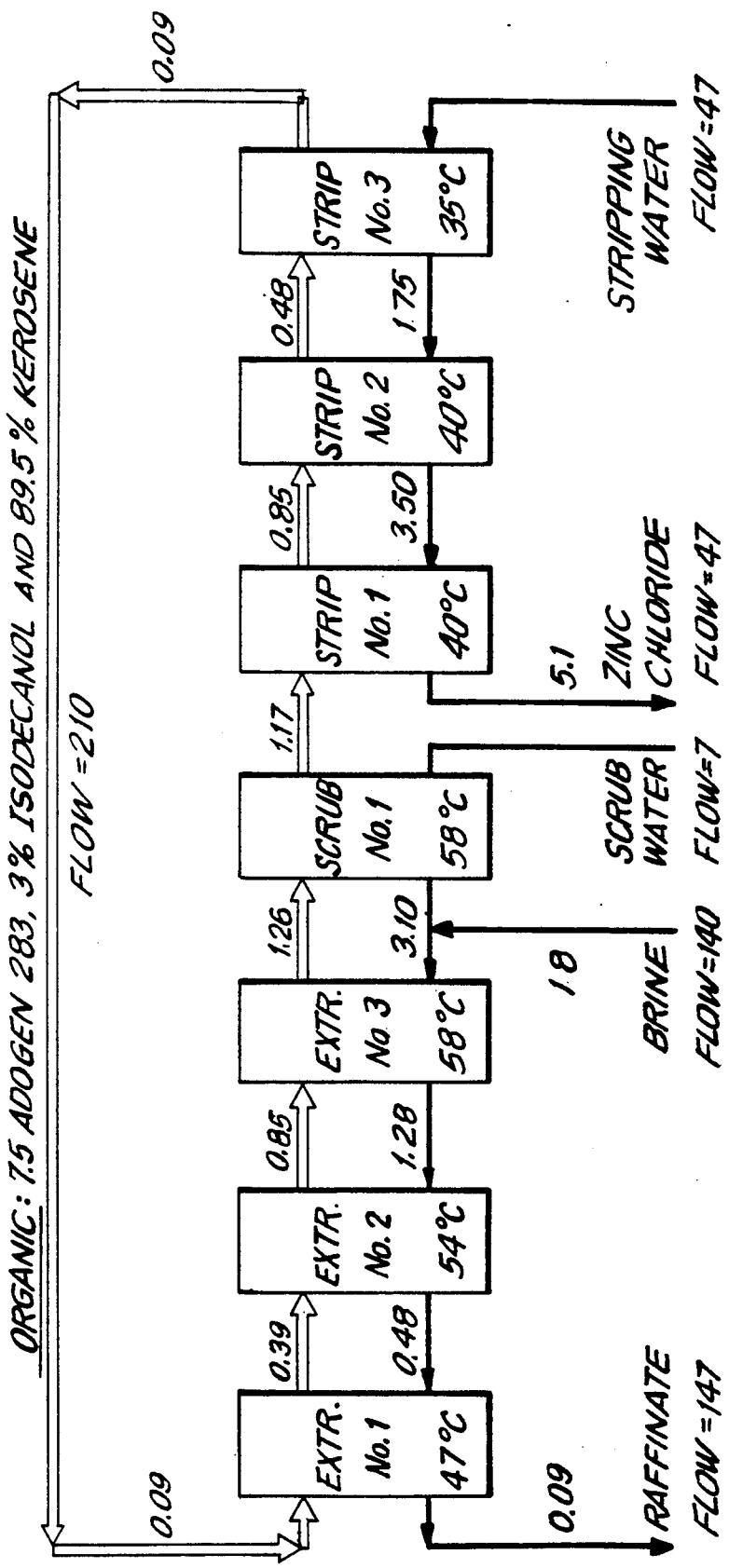
Figure 9:
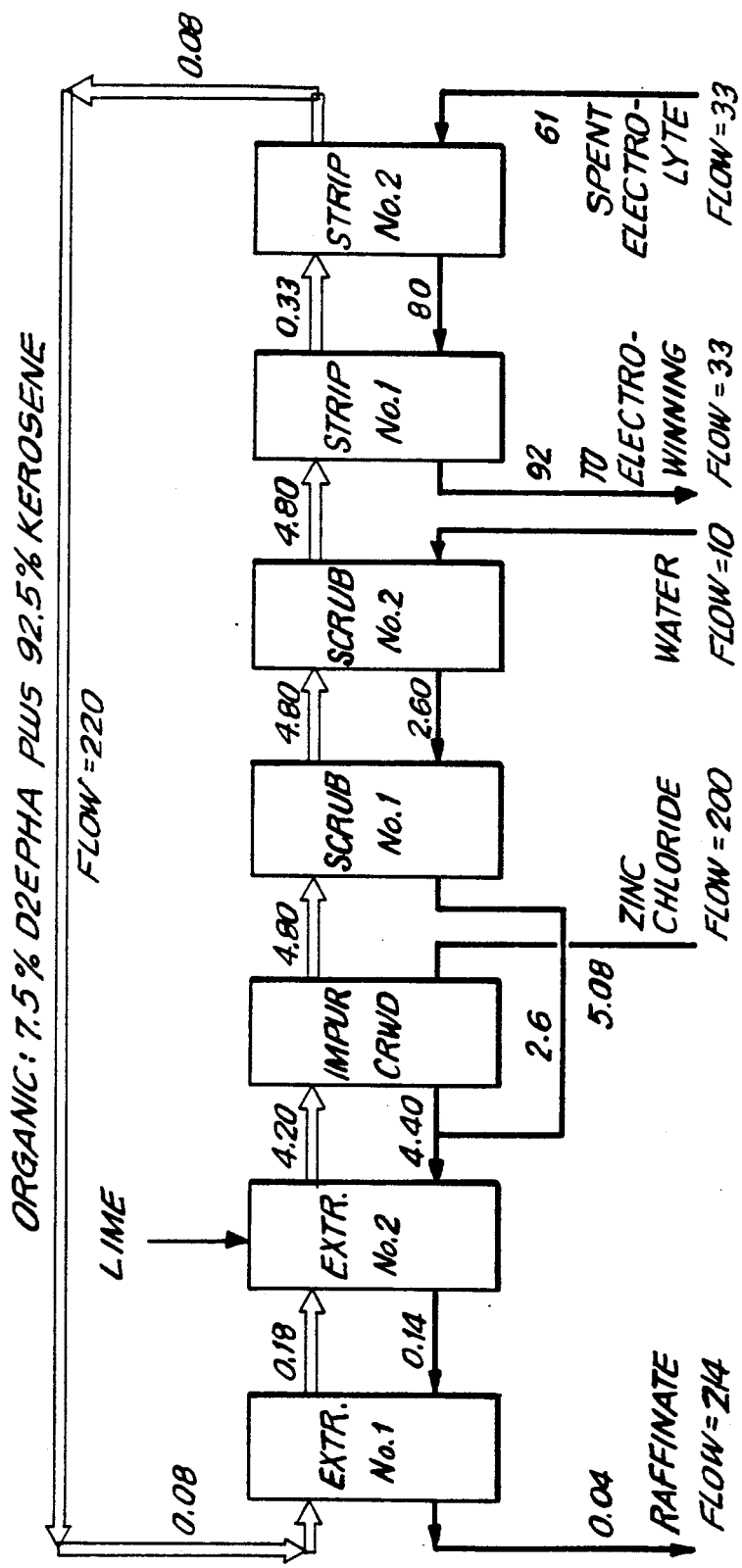
Figure 10:
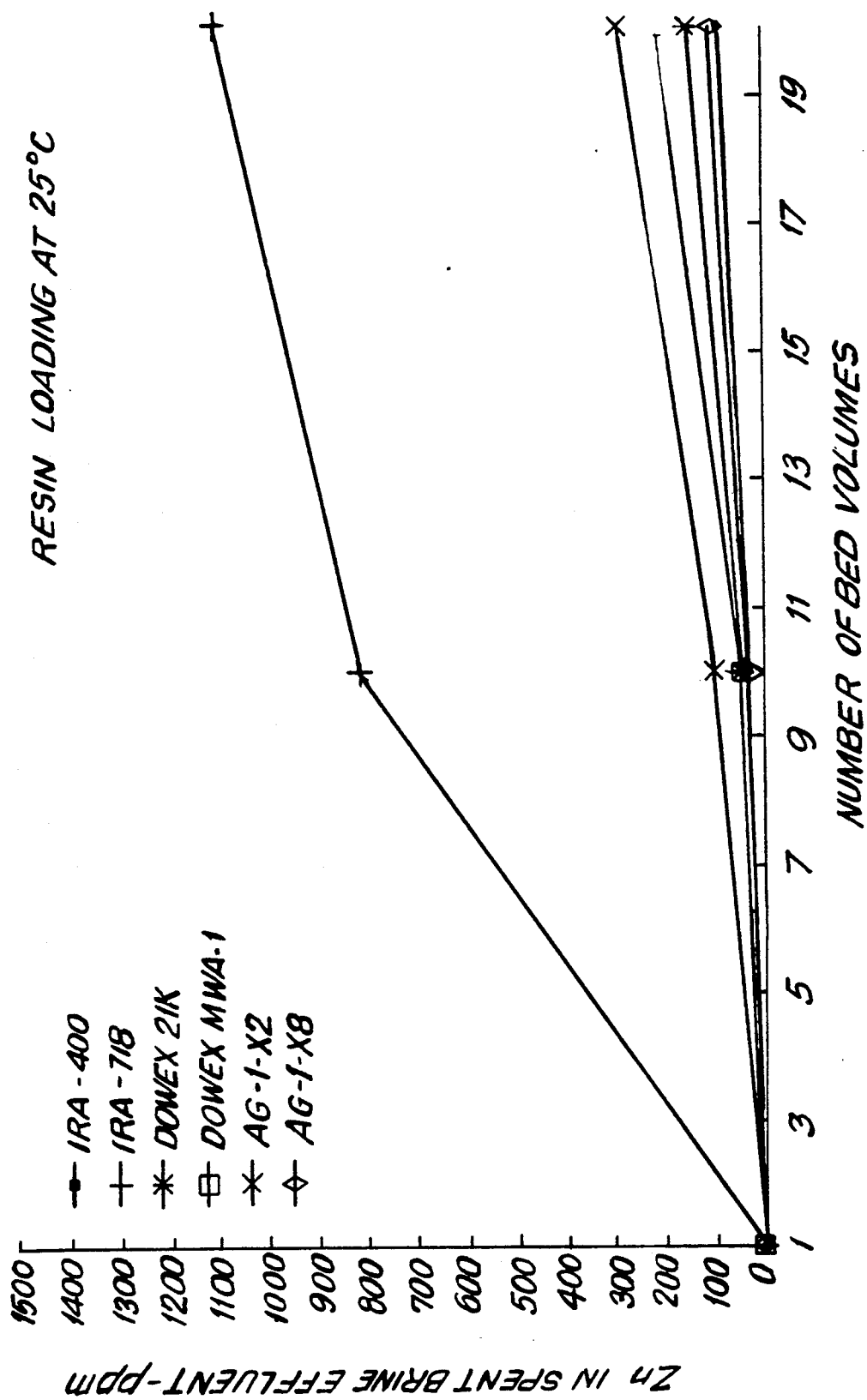
Figure 11:
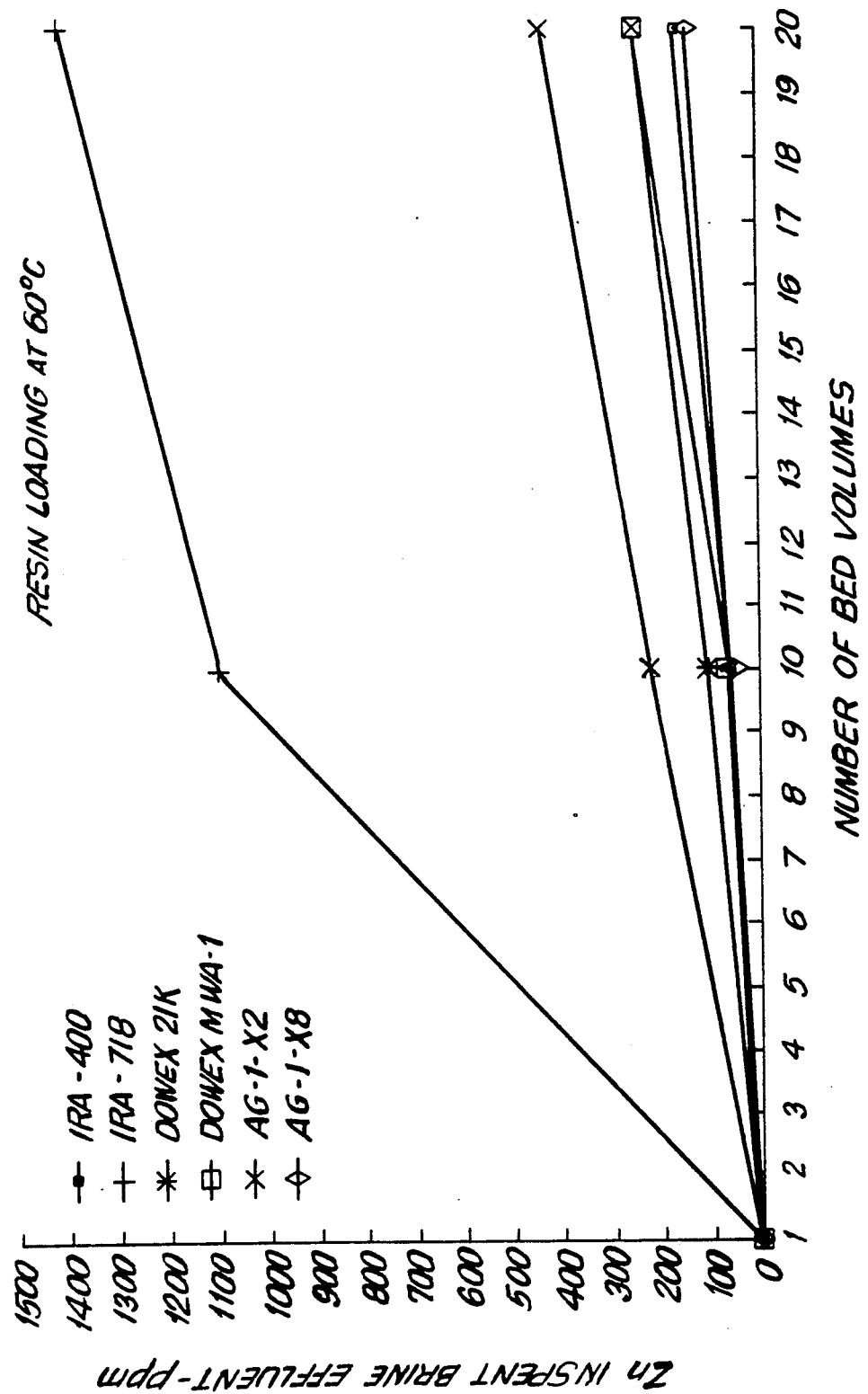
Figure 12:
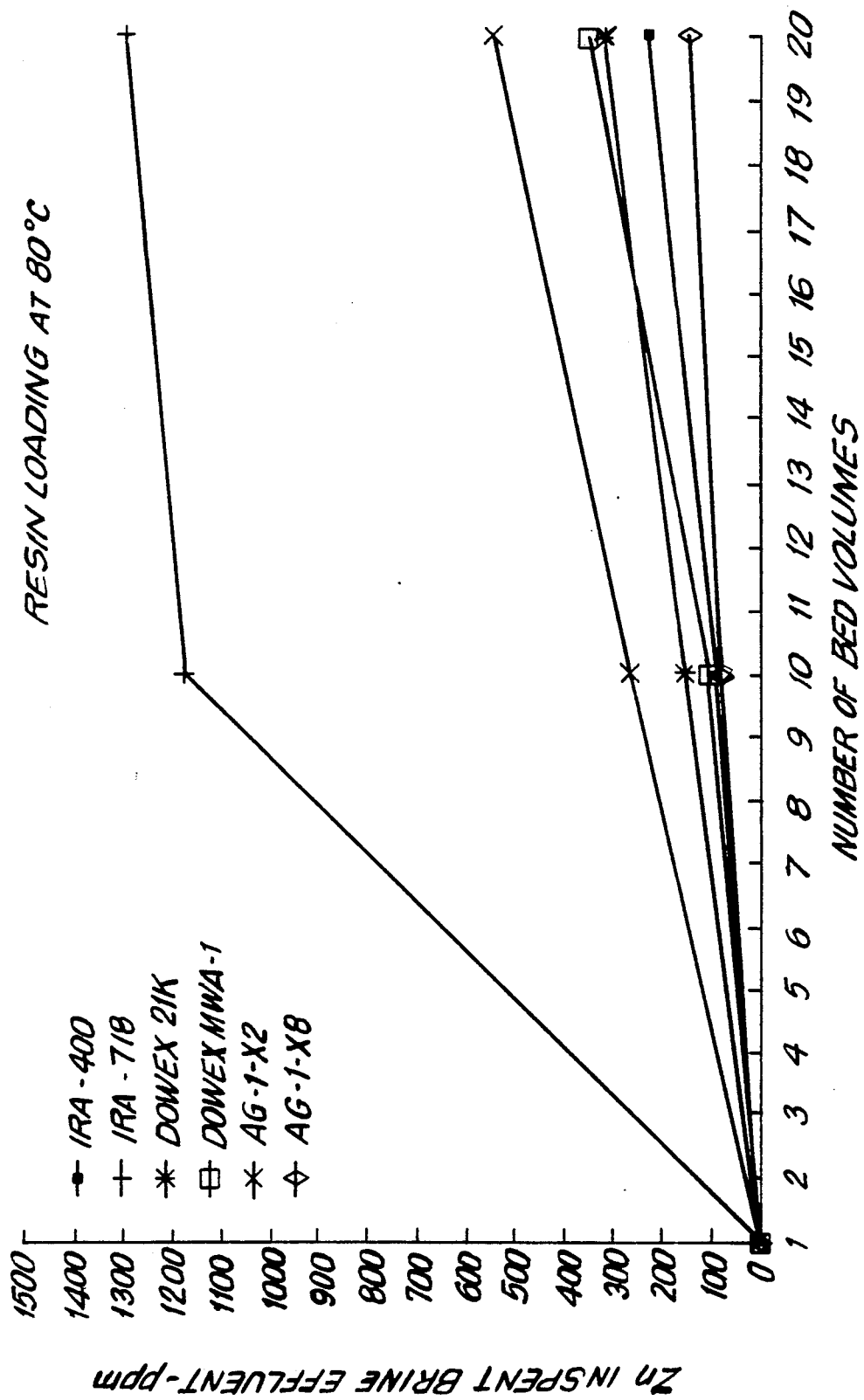
Figure 13:
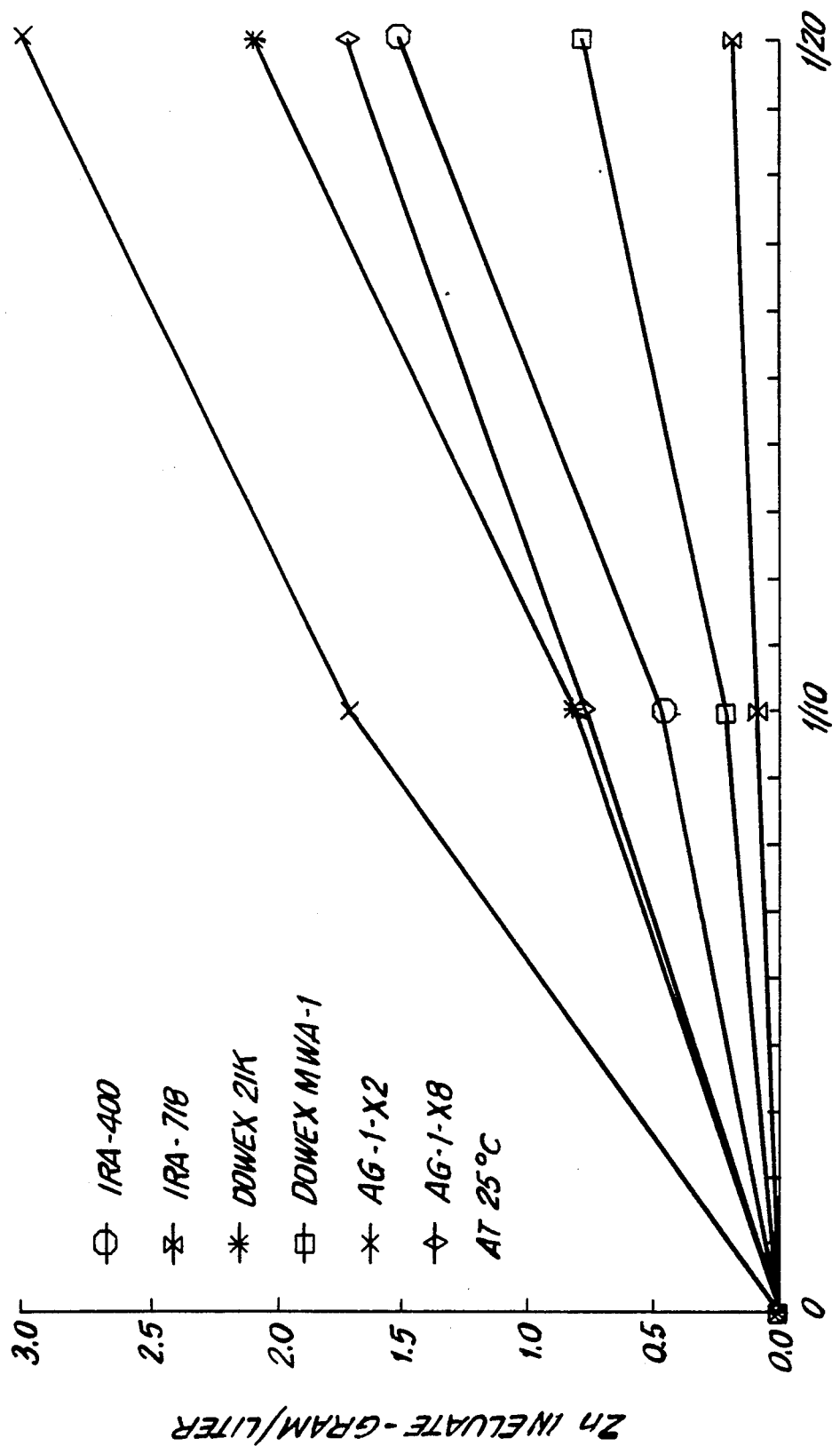
Figure 14:
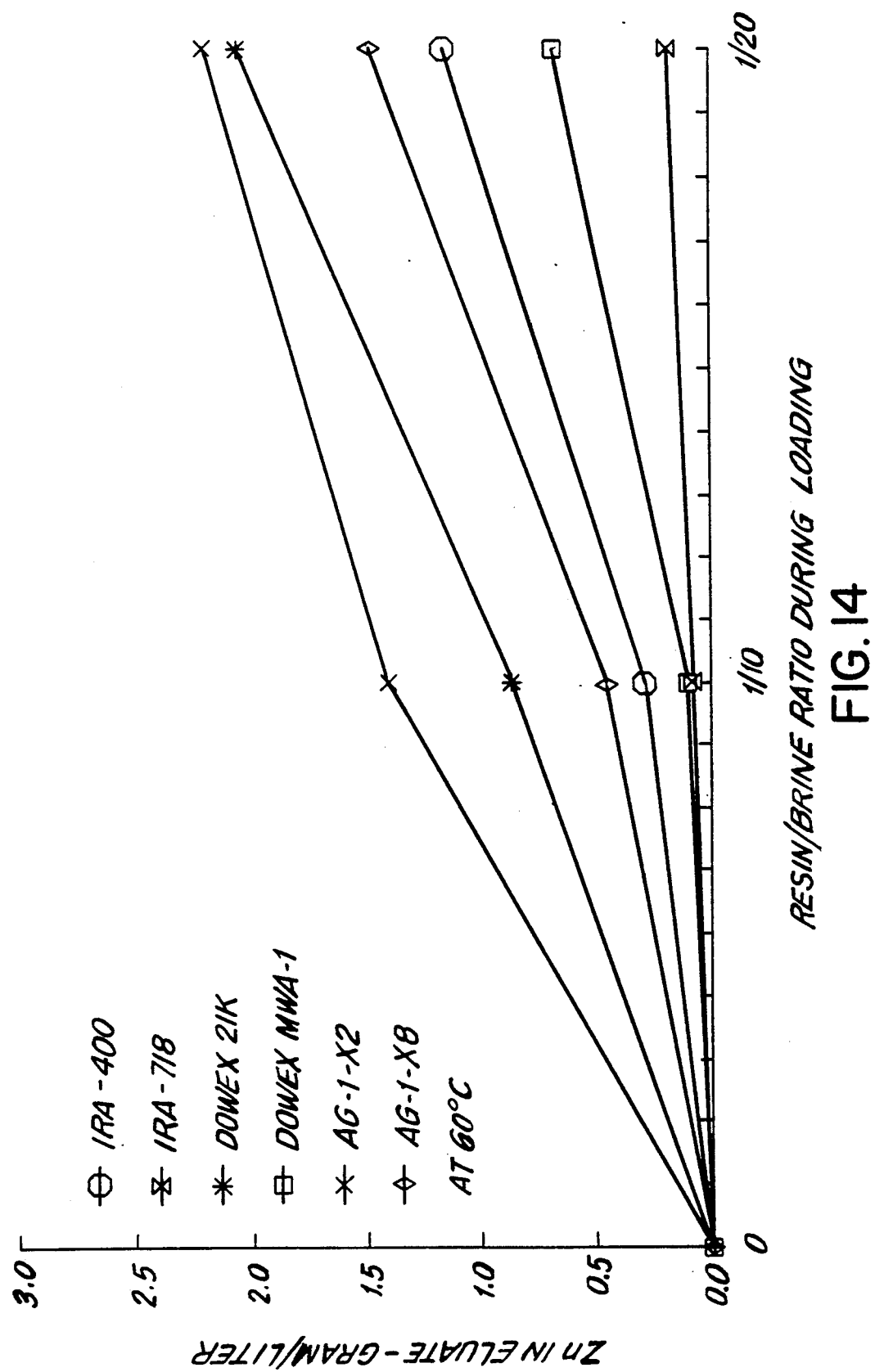
Figure 15:
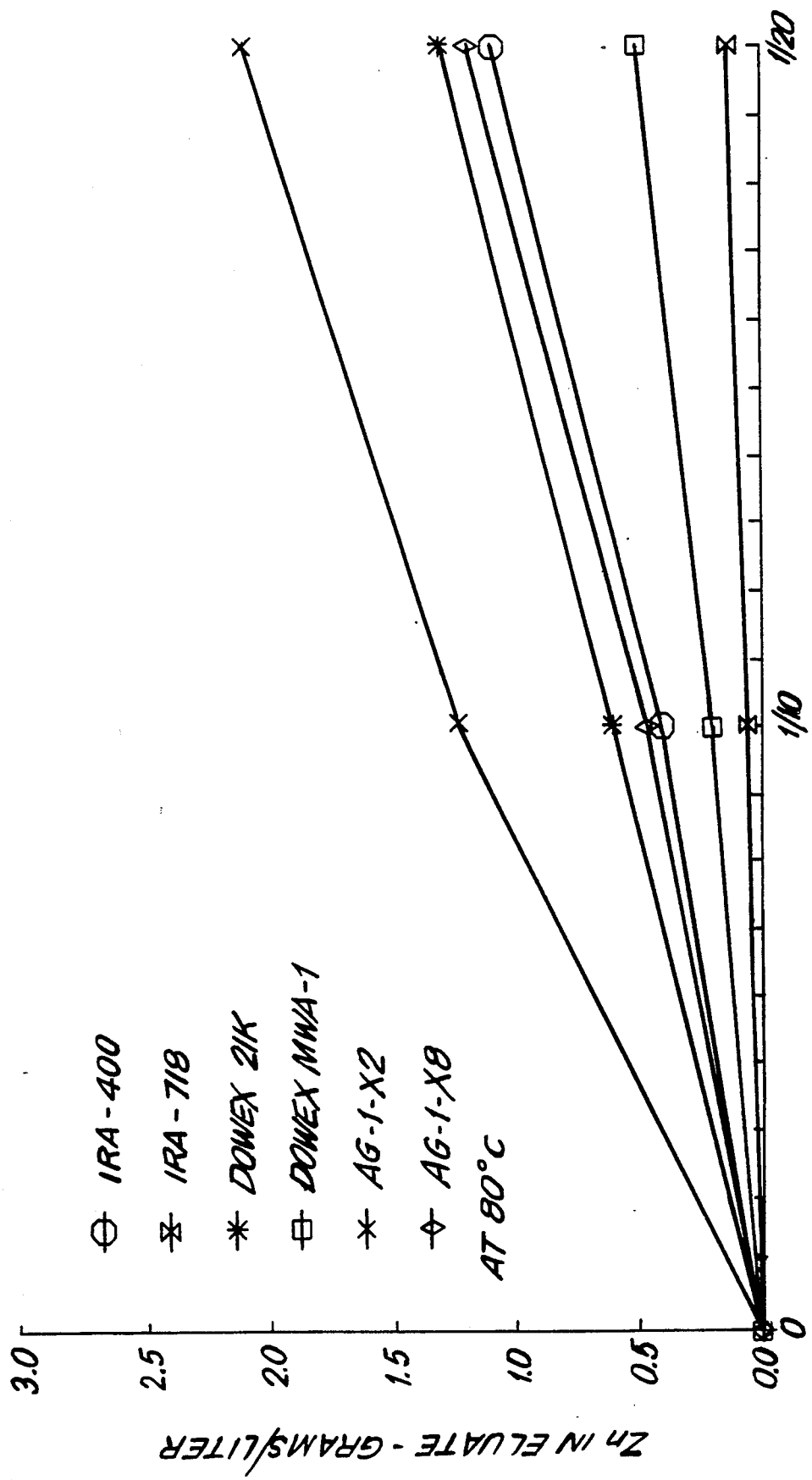
Figure 16:
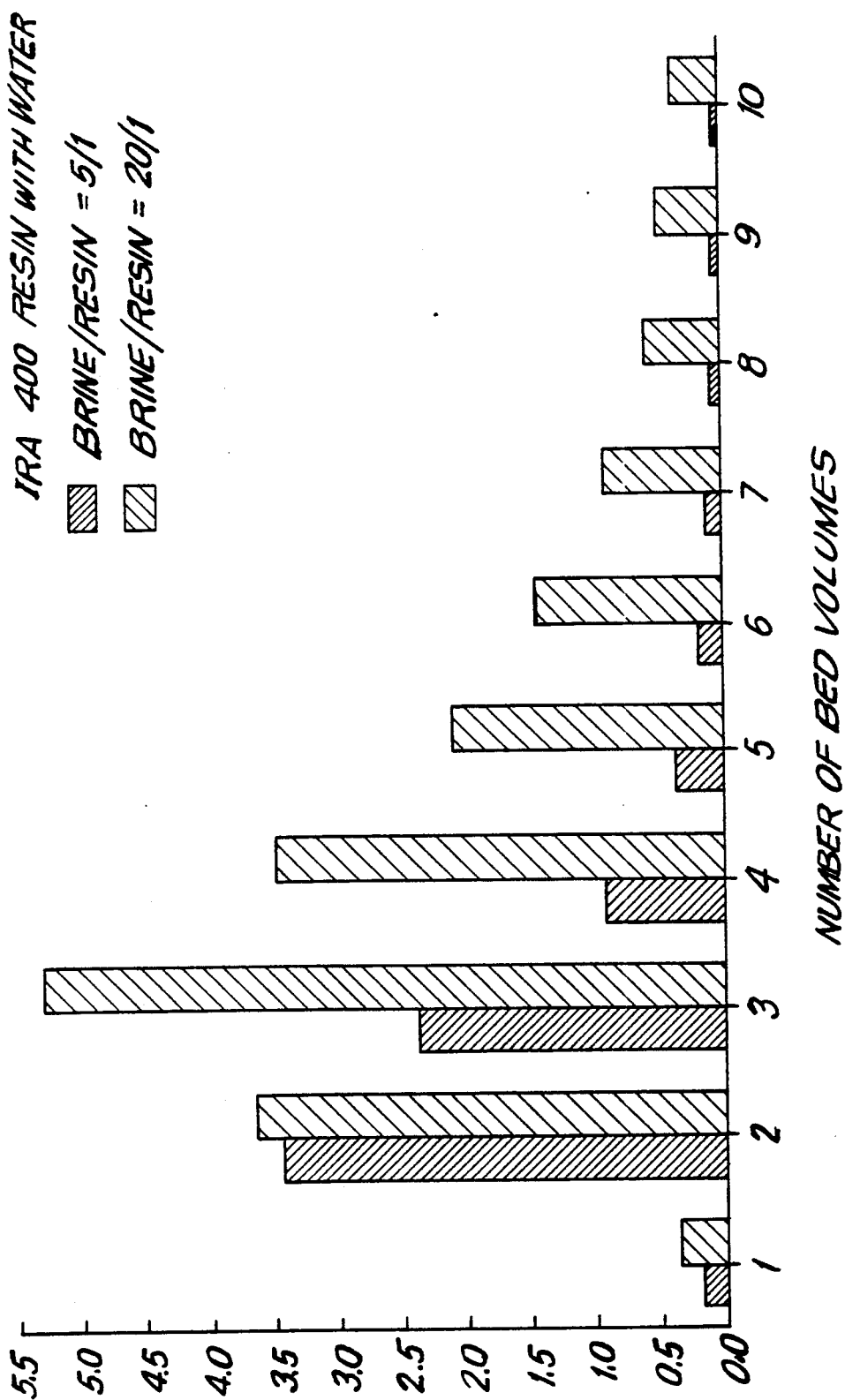
Figure 17:
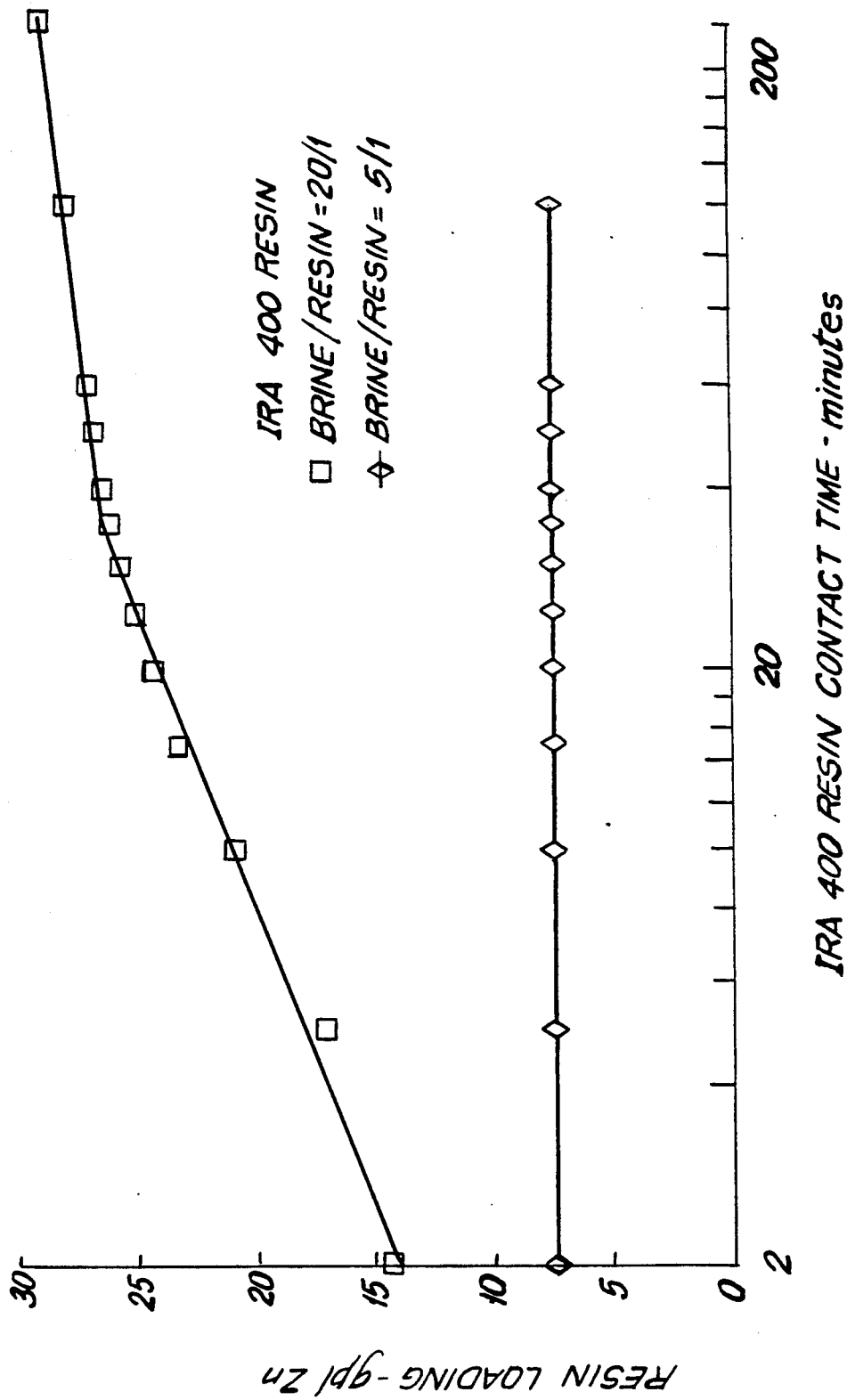
Figure 18:
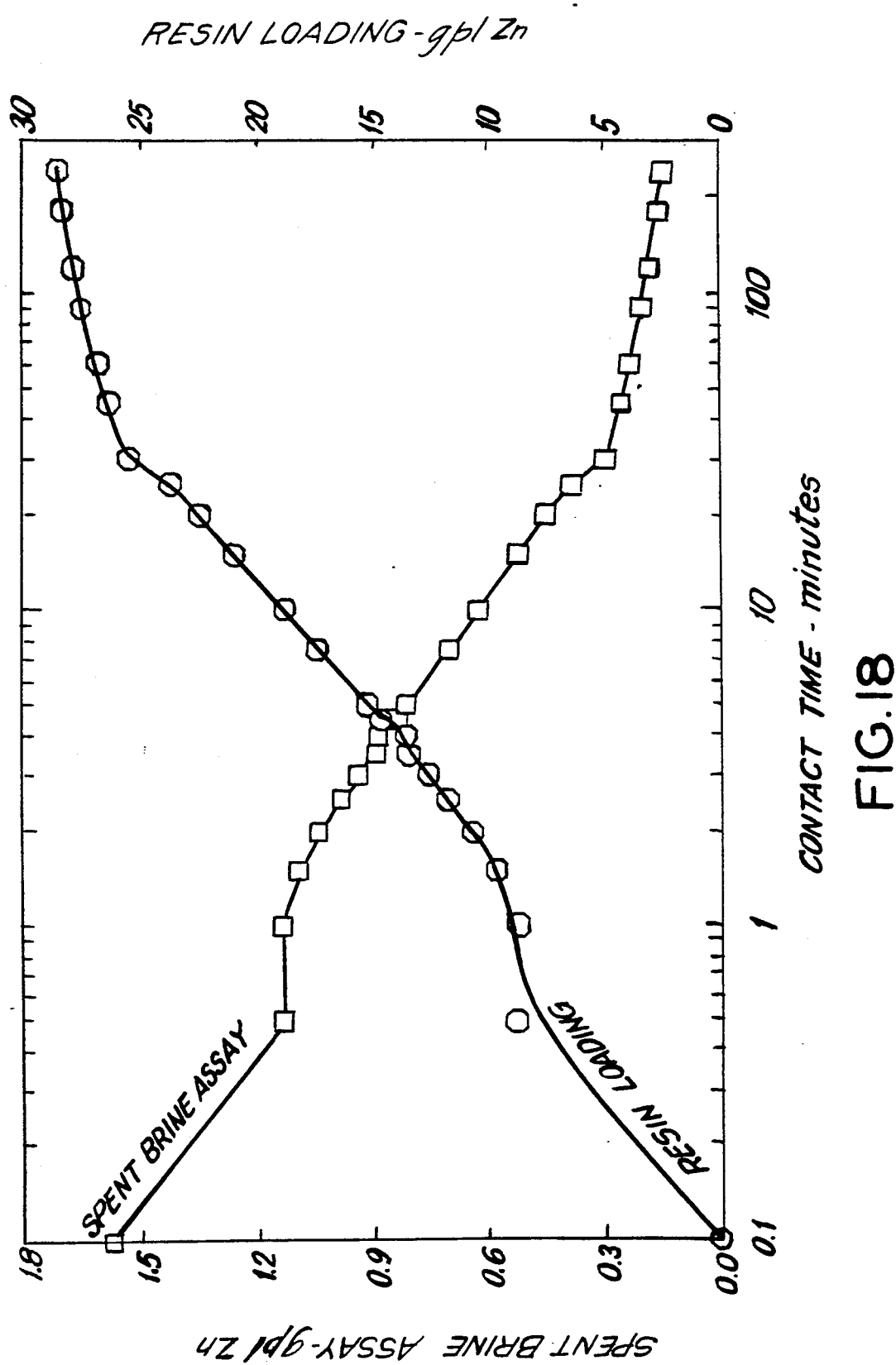
Figure 19:
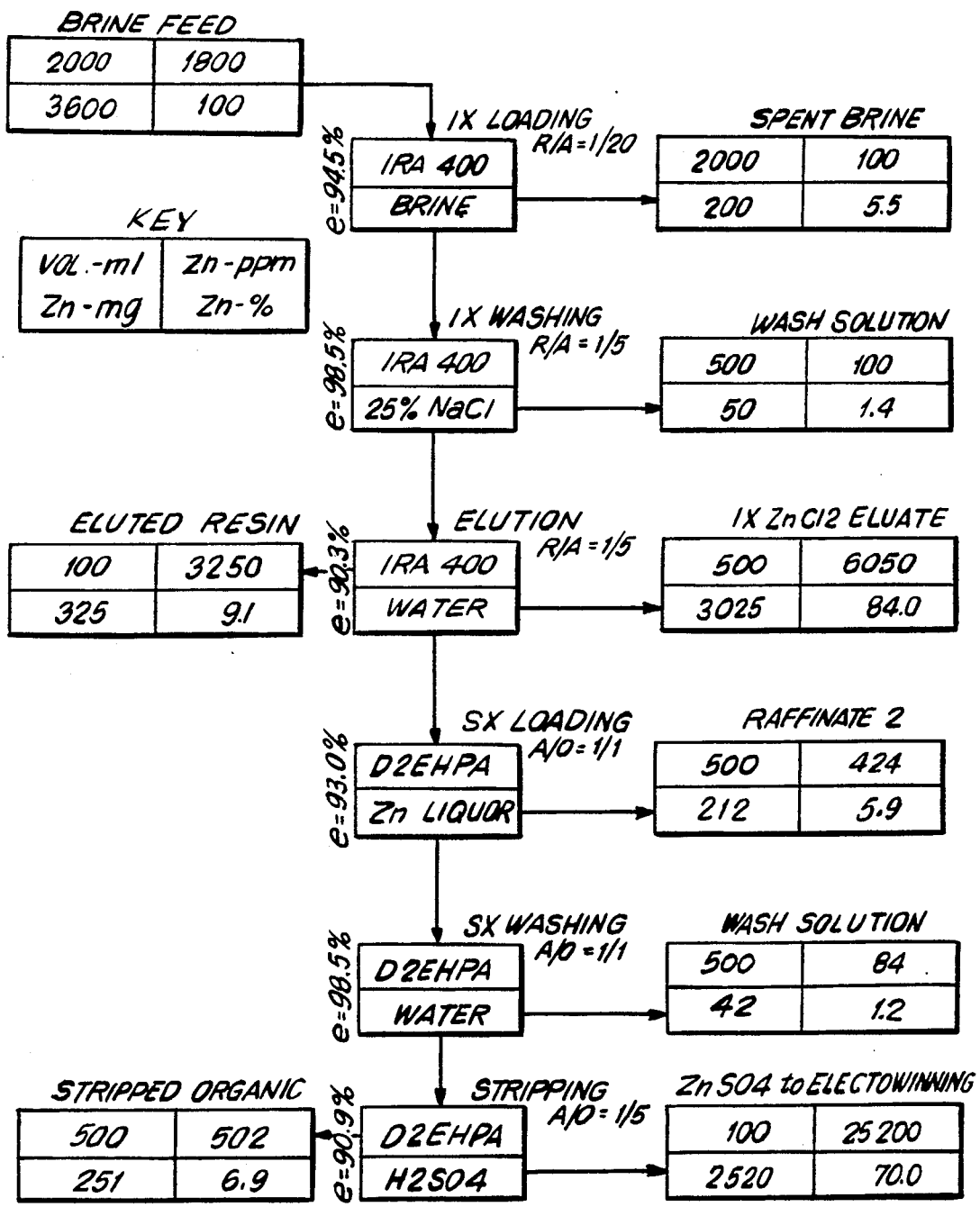

FIG. 6 compares the extraction parameters of Amberlite LA-2 with Adogen 283 of brine at 65° C.;

FIG. 7 compares the stripping parameters of Amberlite LA-2 with Adogen 283 at 40° C.;

FIG. 8 is a flow sheet illustrating the first stage solvent extraction of zinc using an anionic organic solvent designated by the trademark Adogen 283 in a countercurrent testing program using an organic solvent comprising 7.5% Adogen 283, 3% isodecanol and 89.5% kerosene;

FIG. 9 shows a flow sheet of a countercurrent testing program illustrating the second stage solvent extraction of zinc using a cationic organic solvent identified as di-(2-ethylhexyl) phosphoric acid (D2EHPA);

FIGS. 10 to 12 depict loading capacity of certain ion exchange resins at temperatures of 25° C., 60° C. and 80°, respectively;

FIGS. 13 to 15 illustrate the elution characteristics of various ion exchange resins using 6 bed volumes of water as the eluate at 25° C., 60° C. and 80° C., respectively;

FIG. 16 is a graph illustrating the elution of a zinc-loaded resin (IRA 400) at a brine to resin volume ratio of 5/1 and 20/1;

FIG. 17 depicts the zinc loading of IRA 400 resin as a function of time at a resin to brine volume ratio of 5/1 or 1/20;

FIG. 18 is a curve depicting Zinc loading of IRA 400 resin as a function of time at a resin to brine volume ratio of 1/20; and FIG. 19 is a flow sheet tracing the recovery of zinc from geothermal brine in which an ion exchange resin (Amberlite IRA 400) is used in conjunction with a cationic solvent of D2EHPA.

The organic solvents referred to with respect to FIGS. 2 to 7 were used with kerosene as to the diluent.

STATEMENT OF THE INVENTION

Stating it broadly, the invention is directed to a process for the recovery of substantially pure zinc from brine which also contains recoverable amounts of lead, silver and/or other precious or base metals.

In one embodiment, the steps employed include selectively extracting lead and silver from the brine, and passing the brine through a double stage extraction process using organic materials selective to the extraction of zinc. In the first stage, the brine impoverished in said lead and silver in one embodiment is mixed with a water-immiscible anionic organic solvent selective to the extraction of zinc for a time sufficient to transfer the zinc chloride into the anionic solvent and produce a spent brine and a zinc-loaded anionic extractant.

The two immiscible solutions are separated and the process continued with the zinc-loaded anionic solvent. The zinc-loaded anionic organic solvent is mixed with an aqueous solution, such as condensate from an electrical power plant operating on flash steam from geothermal brines, to remove the zinc therefrom as zinc chloride. Sodium sulfate is not required to strip the zinc from the loaded organic phase.

The zinc-loaded aqueous solution is then separated from the anionic organic solvent. The pH of the aqueous solution is optionally adjusted, if necessary, to prepare it from solvent extraction with a cationic organic solvent or extractant. The pH should generally range from about 2 to about 6.

The zinc-loaded aqueous solution is mixed in the second stage of the double solvent extraction process with the cationic organic solvent for a time at least sufficient to selectively take up substantially all of the zinc and the two solutions thereafter separated to provide a zinc-loaded cationic extractant and a spent aqueous solution.

The zinc is thereafter stripped from the zinc-loaded cationic extractant using an amount of sulfuric acid by volume sufficient to provide an electrolyte solution of zinc sulfate of concentration sufficient for the recovery of a substantially pure zinc product by electrowinning.

In another embodiment of the invention, the brine may be contacted with an ion exchange resin selective to the extraction of zinc as the first stage and the zinc thereafter extracted from the resin as an aqueous solution of zinc chloride. The pH of the solution is thereafter adjusted, if necessary, and the zinc extracted using said cationic solvent.

In another embodiment, the two stage extraction may comprise an ion exchange extraction followed by another ion exchange extraction.

DETAILS OF THE INVENTION

Referring first to the first stage anionic extraction step, the extractant may be an organic solvent selected from the group consisting of secondary, tertiary and quaternary amines, the cationic organic extractant being selected from the group consisting of mono-(2-ethylhexyl) phosphoric acid, di-(2-ethylhexyl) phosphoric acid, mono-(2-ethylhexyl) phosphonic acid, di-(2-ethylhexyl) phosphonic acid, di-(2,4,4-trimethyl-pentyl) phosphinic acid, and di-(2-ethylhexyl) phosphinic acid.

The extractants are generally employed with diluents. Typical diluents are organic solvents including kerosene, aliphatic and aromatic organic solvents.

The anionic solvent is either a secondary amine of the general formula $R^1R^2NH$ or a tertiary amine of the general formula $R^1R^2R^3N$ in which $R^1$ is any one of $C_3H_7(CH_2)_5$; $CH_3(CH_2)_7$; $CH_3(CH_2)_9$; $C_2H_5(CH_2)_7$; $CH_3(CH_2)_{11}$; $CH_3(CH_2)_{12}$ or $C_9H_{19}.C_3H_4$; $R^2$ is any one of $C_3H_7(CH_2)_5$; $CH_3(CH_2)_7$; $CH_3(CH_2)_9$; $C_2H_5(CH_2)_7$; $CH_3(CH_2)_{11}$; $CH_3(CH_2)12$ or $CH_4H_9.C_6H_{10}$; and $R^3$ is any one of $C_3H_7(CH_2)_5$; $CH_3(CH_2)_7$; $CH_3(CH_2)_9$; $C_2H_5(CH_2)_7$; $CH_3(CH_2)_{11}$ or $CH_3(CH_2)_{12}$; and wherein the cationic solvent is preferably di-(2-ethylhexyl) phosphoric acid.

One type of secondary amine is that sold under the trademark Amberlite LA-2 (Rohm and Haas) comprising $CH_3(CH_2)_{11}.C_4H_9C_6H_{10}.NH$. Another secondary amine is one referred to as Adogen 283 comprising $CH_3(CH_2)_{12}.CH_3(CH_2)_{12}.NH$. A tertiary amine referred to as Alamine 336 comprises $CH_3(CH_2)_7.CH_3(CH_2)_7.CH_3(CH_2)_7N$.

Another tertiary amine referred to as Adogen 381comprises $C_3H_7(CH_2)_5.C_3H_7(CH_2)_5.C_3H_7(CH_2)_5N$.

When employing an anionic solvent from the group consisting of secondary, tertiary and quaternary amines, organic phase modifiers may be added selected from the group consisting of isodecanol, tributyl phosphoric acid, trioctyl phosphine oxide, tri-isobutyl phosphine sulfide and isobutyl methylketone.

In carrying out the process, the lead and silver are preferably selectively removed from the brine by cementation by adding a metal substantially above lead and silver in the electromotive series, such as zinc, iron and aluminum, zinc being preferred.

Other methods may be employed to selectively remove lead and silver, such as by hydroxide and sulfide precipitation. One method for removing lead or silver as the hydroxide is to add zinc hydroxide or an impure zinc oxide to the brine.

In the case of sulfide precipitation using, for example, $Na_2S$ solution, the pH and the amount of $Na_2S$ are controlled to selectively precipitate lead and silver sulfides while maintaining substantially the zinc ion in solution.

Thus, the invention provides a process by which geothermal brines are processed for the production of a lead-silver product and electrolytic zinc, preferably utilizing on site generated electric power for the metal winning step. The invention includes a double extraction process, wherein zinc chloride molecules are firstly preferably extracted by an anionic or neutral solvent from the brine into a liquid or solid organic phase, and secondly, wherein a cationic solvent extraction system is used to transfer zinc ions from a low grade zinc chloride solution into a high grade zinc sulfate solution, which solution is then processed by conventional electrowinning from a sulfate bath. In place of the anionic solvent, an ion exchange organic resin containing similar functional groups as the anionic solvent may be used for the first stage extraction of zinc.

Figure 1:
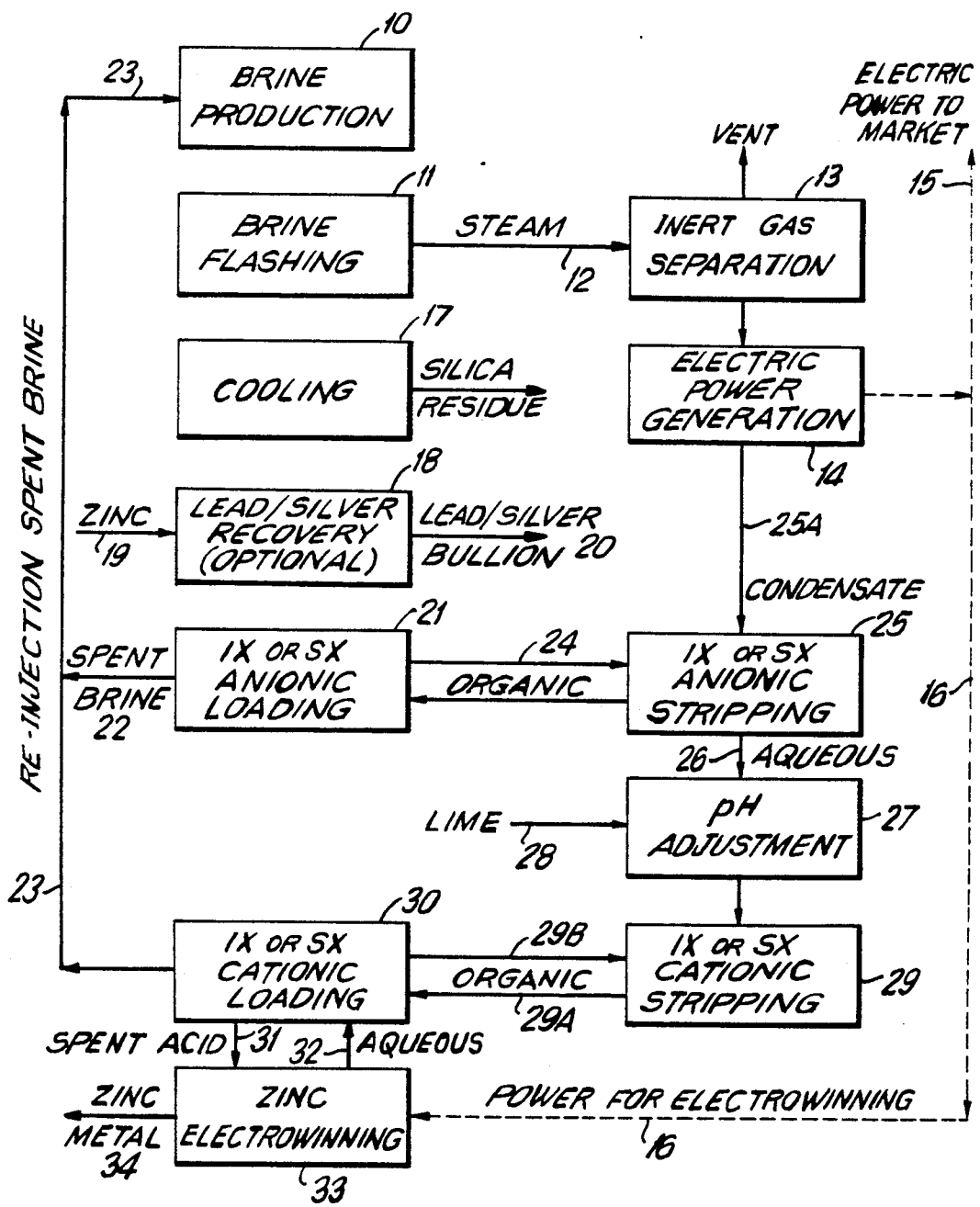
FIG. 1 is a flow sheet showing the coordination of steps employed in recovering zinc from brine using a double extraction process comprising contacting the brine impoverished in lead and silver with a first insoluble organic extractant such as an anionic organic solvent or an ion exchange organic resin followed subsequently by extraction with an cationic organic solvent.

The preferred overall process will clearly appear from FIG. 1 of the drawing which illustrates one embodiment for carrying out the invention insofar as the treatment of geothermal brines is concerned.

Thus, referring to FIG. 1, brine 10 from a subterranean pool is brought to the earth surface and allowed to flash at 11 to produce steam 12 which is separated from inert gas at 13 and the steam used to generate electrical power at 14. The generated power is sold to market 15 and a portion of it, if necessary, is siphoned off at 16 for use in the electrowinning of zinc.

Following cooling at 17, silica residue is removed and cooled brine (40° C. to 60° C.) is passed to lead/silver recovery at 18, preferably by cementation using zinc scrap 19, the lead/silver product being thereafter converted to lead/silver bullion 20 which is further treated to recover pure lead and pure silver. When the ion exchange resin is used, the cooling step may be omitted.

The solution, following lead and silver extraction, is passed to the anionic solvent stage at 21 and mixed with, for example, a secondary amine of the general formula $R^1R^2NH$ dissolved in an organic diluent, such as kerosene. A specific secondary amine is N-dodecyl-1,1,3,3,5,5-hexamethyl hexylamine sold under the trademark Amberlite LA-2 and ditridecylamine sold under the trademark Adogen 283.

Following the solvent extraction of zinc chloride, the spent brine 22 is recycled via line 23 for re-injection to the subterranean brine at 10.

The loaded anionic extractant is passed to stripping stage 25 where condensate 25A from the power plant or water from a different source is mixed with the loaded extractant to remove the zinc chloride and provide an aqueous solution thereof which is adjusted to a desired pH at stage 27 suitable to effect zinc extraction with a cationic solvent.

The pH is adjusted with lime 28 to about 2 to 4 and the pH-adjusted aqueous solution passed to stage 29 where it is mixed with a cationic solvent, preferably di-(2-ethylhexyl) phosphoric acid (D2EHPA), for a time sufficient to substantially completely extract all of the zinc from the aqueous solution.

The loaded cationic extractant is passed via line 29A to stripping stage 30 where it is stripped of the zinc by spent sulfuric acid 31 from the zinc electrowinning cell 33 and provide electrolyte 32 which is fed to zinc electrowinning at 33.

During start-up, make-up sulfuric acid is used which after recycling will generally contain some zinc sulfate. Thus, overall the sulfuric acid content of the stripping solution may range from about 35 to 125 gpl $H_2SO_4$ and after recycling may contain 0 to 60 gpl zinc. The zinc sulfate electrolyte fed to the electrolytic cell 33 following stripping may range from about 50 to 100 gpl.

Following stripping of the zinc at 30, the stripped cationic solvent 29B is recycled to the cationic loading stage at 29.

The power employed to run the electrolytic cell may be any source, but is preferably derived from the power generated by the flash steam at the power generating plant. The zinc product 34 produced is marketable as high purity special high grade zinc.

As illustrative of one embodiment of the invention, the following examples are given:

EXAMPLE 1

A synthetic postflash geothermal brine is treated, the brine containing among other metal values about 1.8 gpl zinc, about 0.4 gpl lead and about 3 ppm silver.

To about one liter of brine were added various amounts of cementing agent in excess of lead stoichiometry to determine the amount sufficient to cement out substantially all of the lead and silver. The mix is agitated for about 60 minutes at a temperature of about 50° C. The brine solution is not acidified but processed at a governing pH of about 4 to 5.

The reactions involved in cementing lead or silver is as follows:

$$2Pb^{++} + Zn^° + 4Cl \rightarrow 2Pb^° + ZnCl_4^{2-}$$

The results obtained are given in Table 1 below:

TABLE 1

| Material | Amount* | % LEAD precipitation | % SILVER precipitation |
|---|---|---|---|
| Zinc Dust | 25 | 19 | 15 |
| Zinc Dust | 50 | 16 | 54 |
| Zinc Dust | 100 | 26 | 30 |
| Zinc Dust | 150 | 42 | 54 |
| Zinc Dust | 500 | 51 | 46 |
| Zinc Dust | 1000 | 87 | 87 |
| Iron Powder | 500 | 69 | 70 |
| Sodium Sulfide | 500 | 96 | 54 |

*% of Pb or Ag STOICHIOMETRY

It will be noted that the addition of zinc powder at 1000% of or ten times the lead or silver stoichiometry gave a high precipitation yield of 87% lead and 87% of silver.

Following cementation, the mixture is subjected to solid/liquid separation. The lead- and silver-impoverished brine is then subjected to solvent extraction to recover the zinc using an anionic secondary amine of the general formula $R^1R^2NH$, more specifically N-dodecyl-1,1,3,3,5,5-hexamethyl hexyl amine sold under the trademark Amberlite LA-2 or a tertiary amine of the general formula $R^1R^2R^3N$ sold as tri octylamine under the trademark Alamine 336.

An evaluation of the behavior of various amines in a brine circuit with water stripping is presented in the following Table 2.

TABLE 2

| Type of Amine | Sold as | Solvent Loading Behavior | Solvent Stripping Behavior |
|---|---|---|---|
| Primary | Primene JM | Not adequate | Not Applicable |
| Secondary | Amberlite | Reasonable | Reasonable |
| Tertiary | Alamine 336 | Good | Fair |
| Quaternary | Aliquat 336 | Excellent | Not adequate |

Figure 2:
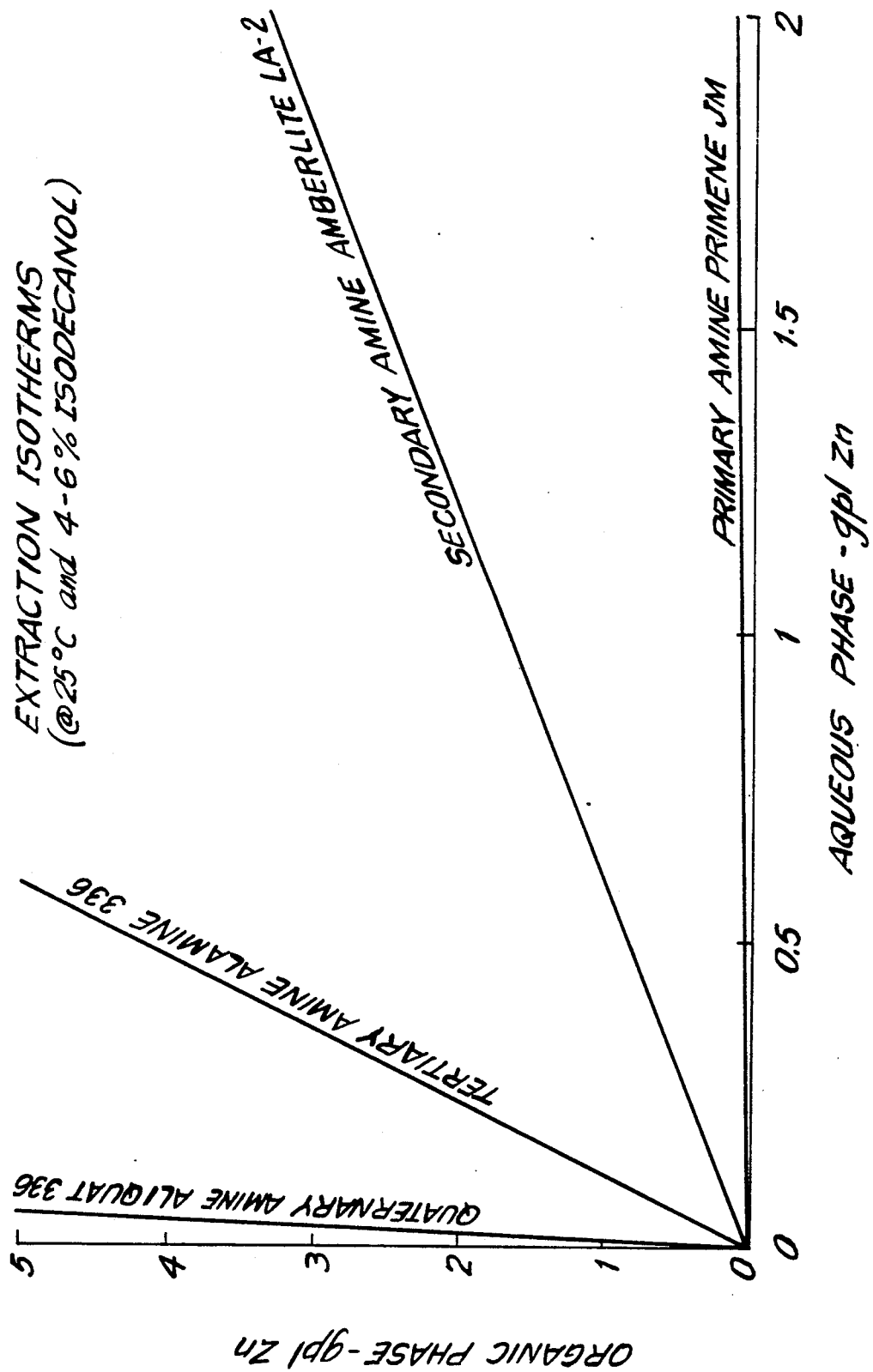
FIG. 2 depicts extraction isotherms at 25° C. comparing primary, secondary, tertiary and quaternary organic amines as the SX solvent containing about 4 to 6% isodecanol (ID)
Figure 3:
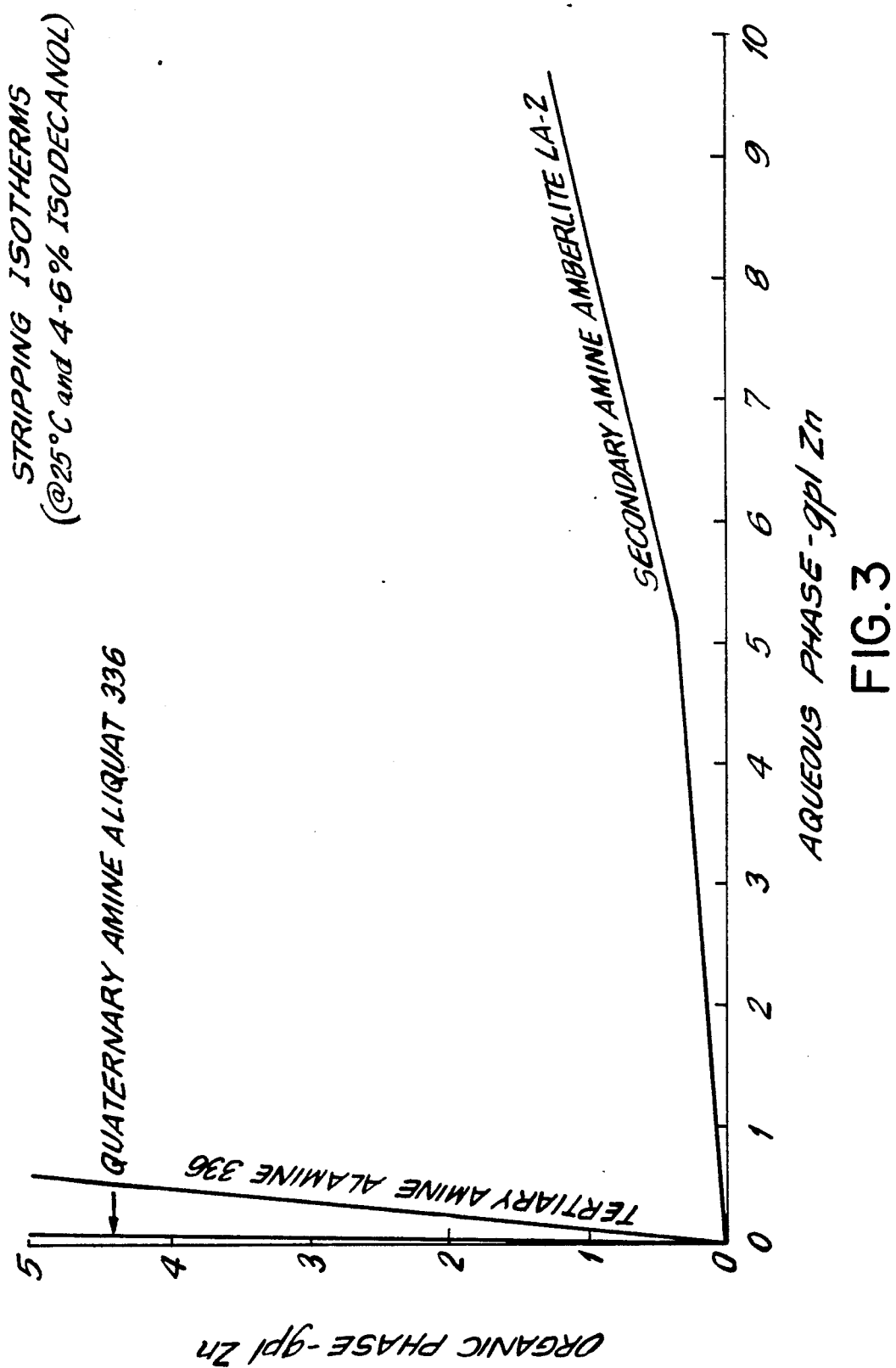
FIG. 3 shows stripping isotherms at 25° C. comparing secondary, tertiary and quaternary organic amines as the SX solvent containing about 4 to 6% isodecanol
Figure 4:
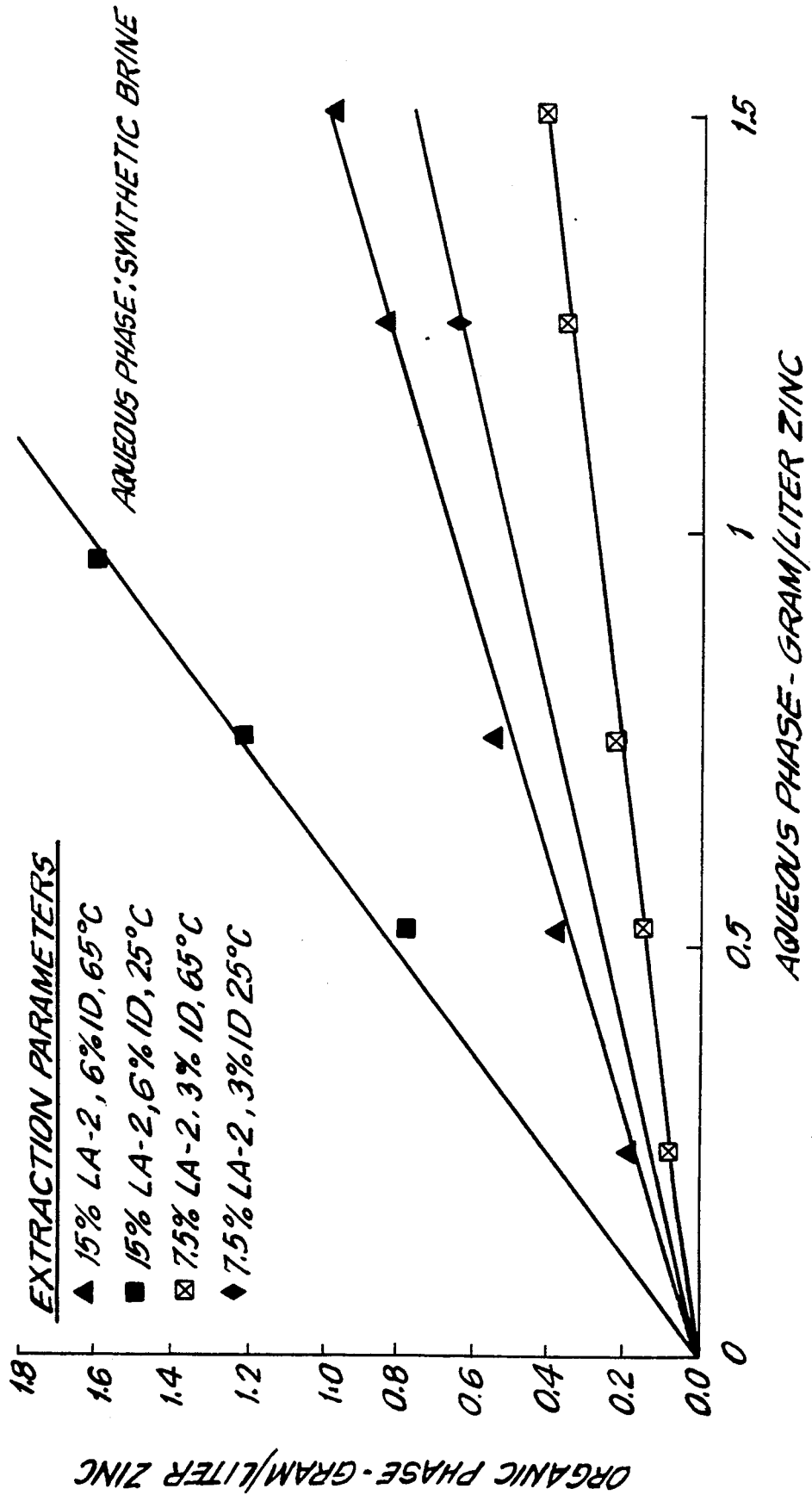
FIG. 4 depicts various extraction isotherms at 25° C. and 65° C. for Amberlite LA-2 at different extraction parameters.
Figure 5:
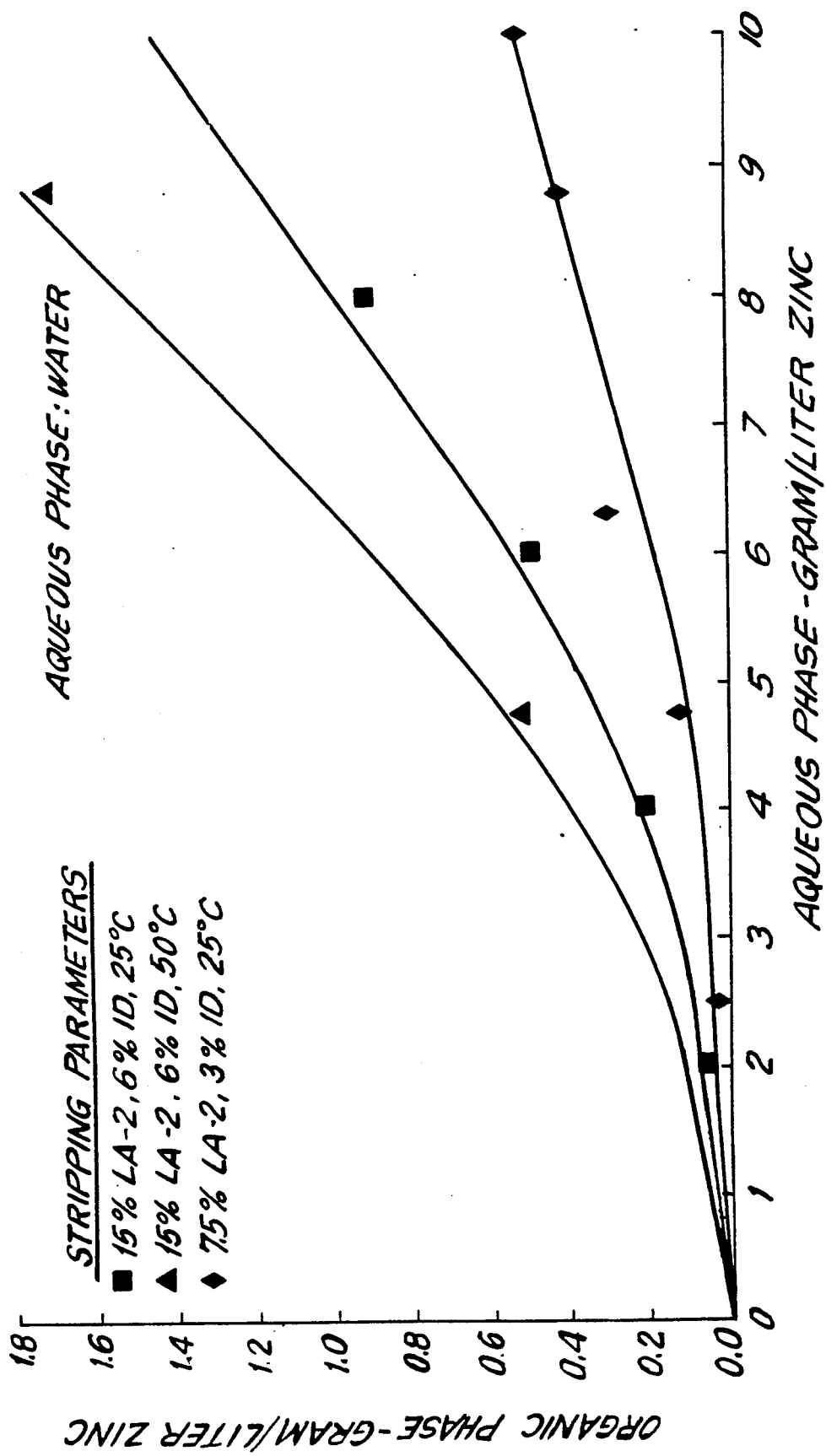
FIG. 5 illustrates the stripping properties at 25° C. and 50° C. of Amberlite LA-2 at various stripping parameters.

This table shows that both the secondary as well as the tertiary amines are suitable for extraction of zinc from brine solutions. Further details are shown in FIGS. 2 and 3 which provide extraction and stripping isotherms for various amines. The effects of both the temperature and the volume percent active organic ingredient on the extraction and stripping behavior is presented in FIGS. 4 and 5. A comparison between two secondary amines, Amberlite LA-2 and Adogen 283 is shown in FIGS. 6 and 7.

Detailed laboratory results from continuous counter-current testing of the two stage solvent extraction process are shown in FIGS. 8 and 9.

The anionic organic solvent is Adogen 283 (a secondary amine) which is diluted with kerosene and a modifier to provide a mixture of about 7.5 vol. % of Adogen 283, about 3 vol. % of isodecanol and about 89.5 vol. % kerosene.

About 140 liters of the brine is mixed with about 210 liters of the aforementioned secondary amine solution as prepared above and the two solutions mixed at a ratio of about 0.67 volume brine to 1 volume organic for about 5 minutes. A preferred ratio is about 0.5 volume of brine to 1 volume of the anionic organic solution. The extraction temperature ranges from about 47° to 58° C.

The mixture is then allowed to separate into two layers and the spent brine removed to provide a zinc-loaded anionic extractant.

An aqueous solution (e.g., condensate from the power plant) is then mixed with the zinc-loaded organic solvent at a volume ratio of about 4.5 volumes of organic solvent to 1 volume of aqueous solution and the two solutions mixed at a temperature of about 35°-40° C. for a time sufficient to remove substantially all of the zinc as zinc chloride from the zinc loaded anionic organic solvent (FIG. 8).

The aqueous solution of zinc chloride controlled at a pH range of about 2 to 6 is then mixed with a cationic organic solvent. Referring to FIG. 9, di-(2-ethylhexyl) phosphoric acid (D2EPHA) is the preferred cationic solvent mixed with kerosene at a volume ratio of 92.5 vol. % kerosene to 7.5 vol. % of D2EPHA or about 12.3 to 1.

The solutions are mixed to provide a zinc-loaded organic solvent which is separated from the spent aqueous solution, the zinc in the organic solvent having a concentration of about 4.8 gpl zinc.

The zinc-loaded D2EHPA is then mixed with a spent sulfuric acid electrolyte of concentration of about 120 gpl $H_2SO_4$ and 61 gpl zinc at a volume ratio of approximately 7 to 1. There is a direct exchange of zinc and hydrogen ions whereby a zinc-loaded aqueous solution is obtained containing about 92 gpl of zinc as $ZnSO_4$.

The zinc-loaded sulfuric acid solution is then subjected to electrolysis to recover substantially pure zinc plated out on an aluminum cathode.

By employing the foregoing method described in the Example, a zinc electrolyte is produced ranging from 25 to 125 gpl.

The sulfuric acid used to extract the zinc ranges from about 35 to 135 gpl $H_2SO_4$. If recycled sulfuric acid from electrolysis is used to recover the zinc, the recycled solution may contain 0 to 60 gpl zinc.

As an alternative to the aforementioned double solvent extraction (SX) method of recovering zinc from geothermal brines, an ion exchange circuit (IX) may be used in combination with solvent extraction (SX) using IX resins selective to zinc. As another alternative, a double IX circuit may be employed. In one embodiment, a resin impregnated with D2EHPA as the active ingredient can be used.

EXAMPLE 2

In further test work, the following resins sold under the trademarks indicated were considered:

| | |
|---|---|
| Amberlite IRA-400: | Strong Basic Anion Exchanger - Rohm & Haas |
| Amberlite IRC-718: | Chelating Ion Exchanger - Rohm & Haas |
| Dowex 21K: | Strong Basic Anion Exchanger - Dow Chemical |
| Dowex MWA-1: | Weakly Basic Resin - Dow Chemical |
| AG-1-X2: | Strong Basic Anion Exchanger, 2% cross linked - Biored |
| AG-1-X8: | Strong Basic Anion Exchanger, 8% cross linked - Biored |

Resins Loading Cycle

Tests were carried out to determine the operating capacities of the aforementioned resins using a shaker-bath model #6250 from Erlenbach Co. Two Resin/Brine ratios were chosen 1/10 and 1/20. This is near the optimum operating capacity of the IRA-400 as previously tested. Twelve erlenmeyers (2 for each resin) were loaded in the shaker-bath and run for 3 hours residence time at 3 different temperatures: ambient (25° C., 60° C. and 80° C.).

The results of the tests are shown graphically in FIGS. 10 (ambient temperature 25° C.), 11 (60° C. temperature) and 12 (80° C. temperature), which present the ppm of zinc in the brine effluent versus the number of bed volumes that were in contact with the resins. The loading results at ambient temperature indicate that, with the exception of IRA-718, all the resins were able to load about 85% to 95% of the zinc from the synthetic brine utilized in the studies. The data obtained at 60° C. indicate that four resins (IRA-400, Dowex 21K, Dowex MWA-1 and AG-1-8) were not affected by the operating temperature. However, the loading efficiency of the AG-1-X2 resin dropped from 93 to 77%. The results obtained at 80° C. are similar to those obtained at 60° C. in that they show a further decrease in loading capacity of the AG-1-X2 resin. The Dowex ion exchange resins are made from styrene-divinylbenzene copolymers. The other resins are somewhat similar. These resins are characterized by a large number of ionizable or functional groups attached to the hydrocarbon matrix.

The test results of Example 2 indicate that four resins may be utilized for loading zinc from geothermal brines with the average loading capacity ranging up to about 30 to 32 grams of zinc per liter.

Elution with Water

The resins following loading thereof with zinc are eluted with water. The NaCl washing step was not used. (The standard procedure comprises a NaCl wash in order to take out the iron impurity from the loaded resin). The elution was carried out using the shake-bath for 1 hour residence time and at the 3 different temperatures indicated in FIGS. 10, 11 and 12. Six bed volumes of eluant were in contact with the resins during the test.

The elution results are shown graphically in FIGS. 13, 14, and 15. At ambient temperature (25° C.), the data show that four resins; IRA-400, Dowex 21K, AG-1-X2 and AG-1-X8 gave acceptable results with the Biored AG-1-X2 producing the highest zinc liquor (3,000 mg/liter). The results at 60° C. and 80° C. indicate a similar pattern within the resins studied, with a drop of 20% in the zinc level of the eluate liquor.

From an elution point of view, the four resins IRA-400, Dowex 21K, AG-1-X2 and AG-1-X8 gave desirable results.

The following observations were made based on the tests conducted in Example 2:

The results indicate that of the six resins tested, four resins gave markedly acceptable results and can be used to extract zinc from the geothermal brines even at high temperatures in the range 60°-80° C. The studies also confirmed the high loading efficiencies obtained previously with the IRA-400 resin. The four resins are IRA-400, Dowex MWA-1, Dowex 21K and AG-1-X8. The resin AG-1-X2 performance was somewhat influenced by the high temperature. The IRA-718 resin did not provide adequate results.

The elution study was carried out without the usual NaCl wash. The eluate liquor assayed up to 3 grams/liter. Higher concentrations can be obtained easily as shown in previous results when eluate liquors assaying over 5 grams/liter Zn were obtained when a regular fixed bed column was used. This is indicated in FIG. 16.

These test results indicate that basically any strong basic resin in satisfactory and that operating at a temperature higher than the maximum recommended operating temperature for solvent extraction is feasible.

In summary, the use of ion exchange recovery of zinc as described in Example 2 may in some instances be preferred over the double solvent extraction process.

While the only difference between the two approaches is that the ion exchange circuit (IX) replaces the solvent extraction loop (SX), there appears to be some important advantages to be gained for the IX-SX process versus the double SX process. These advantage are summarized as follows:

In the first instance, the brines are essentially (super-)saturated with silica. If the brine temperature drops during solvent extraction, "crud" formation generally results and a third phase (a mixture of solids and organic breakdown products) forms at the interphase between the aqueous and the organic phase. In the ion exchange system any solids formed are flushed out of the system as only the coarse resin is retained in the process vessel.

In the second instance, the stability of the SX organic phases decreases somewhat at temperatures of 50° C.

and higher which results in very high losses. Operating at temperatures higher than 60° C. is to be avoided in that the solvent extraction organic phase is substantially unstable. The stability of the ion exchange resin, however, is much better at higher temperatures as some of the manufactures generally furnace stability at or near 100° C. Cooling of brines (for the Double SX Process) that flash at about 105° C. is expensive and complex and is generally not being done. The kinetics of IX loading are exchanged by the higher temperature whereas settling in the SX system becomes problematic at higher temperatures.

Generally, solvent extraction is the preferred route for metal recovery if selectivity is of prime importance. Ion exchange is somewhat less selective. If the IX route is followed by a selective SX unit, this problem is overcome. As they lack selectivity, IX resins are more powerful than the SX reagents. Tests have shown that resins can load around 30 grams of zinc per liter of resin. SX organics only load around 2 grams of zinc per liter of organic. Using an IX step to upgrade the 1.8 gpl Zn brine to a zinc chloride solution of about 6 gpl Zn is economical as only a small IX circuit is needed.

The particular reason why the IX circuit is so attractive in carrying out the process on geothermal brines is the ability of using plain water to strip the neutral zinc chloride from therein. With regard to zinc stripping, water condensate from the power plant is ideally suited as a strip solution.

FIGS. 16–19 illustrate results obtained with IRA 400 Resin. FIG. 16 depicts elution of zinc-loaded resin at volume ratios of 5/1 and 20/1.

FIG. 17 shows zinc loading for geothermal brines at a resin to brine volume ratio of 1/20.

FIG. 18 depicts the kinetics of zinc loading on IRA 400 resin at a brine resin volume ratio of 5 to 1 and 20 to 1.

FIG. 19 is a flow sheet showing the use of the IX-SX process in recovering zinc from geothermal brine, a key being provided to explain the data given at each stage of flow sheet.

Referring to the flow sheet of FIG. 19, brine feed 35 in amount of 2,000 ml (or 2 liters) containing 1800 ppm zinc (or 1.8 gpl) is fed to IX loading column 36. Spent brine 37 is drawn off and the zinc-loaded resin washed at 38 with a 25% NaCl solution to provide wash solution 39.

Following washing, the zinc-loaded resin is eluted with water at 40 to provide 500 ml of an eluate 41 and eluted resin 42 containing 3,250 mg zinc or 6.5 gpl zinc. The eluate is subjected to solvent extraction (SX) at 43 with a cationic solvent, to wit, di-(2-ethylhexyl) phosphoric acid (D2EHPA) to provide a raffinate 2 at 44.

The cationic solvent is washed at 45 with water to provide wash solution at 46. The washed zinc-loaded cationic solvent is stripped with sulfuric acid at 47 to provide a zinc sulfate electrolyte at 48 and a stripped organic at 49. The zinc sulfate electrolyte at 100 ml contains 2,520 mg of zinc or 25.2 gpl zinc.

As will be noted, the IX loading at 36 was carried out at a resin to brine volume ratio (R/A) of 1/20, the IX washing at a volume ratio of resin to NaCl (25%) solution of 1/5 and the elution of zinc with water at a resin to water volume ratio (R/A) of 1/5.

SX loading at 43 was conducted at a volume ratio (O/A) of 1/1, while the washing of solvent (SX) was conducted at a volume ratio (O/A) of 1/1. The stripping of the zinc from the loaded organic was conducted at a volume ratio of acid to organic (O/A) of 5 to 1.

Three methods are provided for recovery zinc from geothermal brine: (1) the double solvent extraction method, i.e., SX/SX, (2) the mixed extraction method, i.e., IX/SX, using a resin somewhat selective to the extraction of zinc (ion exchange) and the IX/IX method, whereby the second IX step utilizes a resin that is impregnated with cationic solvent selective to the extraction of zinc, such as di-(2-ethylhexyl) phosphoric acid (D2EHPA)

Although the present invention has been described in conjunction with the preferred embodiments, it is to be understood the modifications and variations may be resorted to without departing from the spirit and scope of the invention as those skilled in the art will readily understand. Such modifications and variations are considered to be within the purview and scope of the invention and the appended claims.

What is claimed is:

1. A process for the recovery of substantially pure zinc from a zinc chloride-containing geothermal brine, said geothermal brine also containing base metals and precious metals which comprises:

contacting said geothermal brine with a first insoluble extractant selective to the extraction of zinc to produce a spent geothermal brine solution, and a zinc-loaded organic extractant, selectively extracting said zinc from said organic extractant in the form of an aqueous solution of zinc chloride, adjusting the pH of said aqueous zinc chloride solution, if necessary, to a level to condition the solution to promote the extraction of said zinc by a second organic extractant selective to zinc, extracting said zinc from said aqueous solution using said second organic extractant selective to the extraction of zinc, thereby producing a zinc-loaded organic extractant, stripping said zinc from said zinc-loaded extractant using an amount of sulfuric acid by volume sufficient to provide an electrolyte solution containing a concentration of zinc as zinc sulfate sufficient for the recovery thereof by electrowinning, and then electrowinning said zinc from said electrolyte to provide a product of substantially pure zinc.

2. The process of claim 1, wherein the first organic extractant is selected from the group consisting of an ion exchange resin and an anionic organic solvent, and wherein the second organic extractant is selected from the group consisting of an ion exchange resin and a cationic solvent.

3. The process of claim 2, wherein said resin of said second organic extractant is impregnated with a cationic organic extractant selective to the extraction of zinc, said cationic extractant being dissolved in an organic diluent.

4. The process of claim 2, wherein the ion exchange resin of the first organic extractant is a strong base anion exchanger and the anionic solvent of the first organic extractant is selected from the group consisting of secondary, tertiary and quaternary amines selective to the extraction of zinc from an aqueous solution thereof.

5. The process of claim 1 or 3, wherein the second organic extractant is a cationic organic solvent selected from the group consisting of mono-(2-ethylhexyl) phosphoric acid, di-(2-ethylhexyl) phosphoric acid, mono-(2-ethylhexyl) phosphonic acid, di-(2-ethylhexyl) phosphonic acid, di-(2,4,4-trimethyl-pentyl) phosphinic acid, and di-(2-ethylhexyl) phosphinic acid.

6. The process of claim 2, wherein the anionic solvent is a secondary amine of the general formula $R^1R^2NH$ in which $R^1$ is any one of $C_3H_7(CH_2)_5$; $CH_3(CH_2)_7$; $CH_3(CH_2)_9$; $C_2H_5(CH_2)_7$; $CH_3(CH_2)_{11}$; $CH_3(CH_2)_{12}$ and $C_9H_{19}.C_3H_4$; $R^2$ is any one of $C_3H_7(CH_2)_5$; $CH_3(CH_2)_7$; $CH_3(CH_2)_9$; $C_2H_5(CH_2)_7$; $CH_3(CH_2)_{11}$; $C_4H_9.C_6H_{10}$; and $CH_3(CH_2)_{12}$; and wherein the cationic solvent is di-(2-ethylhexyl) phosphoric acid.

7. The process of claim 2, wherein the anionic solvent is a tertiary amine of the general formula $R^1R^2R^3N$ in which $R^1$ is any one of $C_3H_7(CH_2)_5$; $CH_3(CH_2)_7$; $CH_3(CH_2)_9$; $C_2H_5(CH_2)_7$; $CH_3(CH_2)_{11}$; $CH_3(CH_2)_{12}$ or $C_9H_{19}.C_3H_4$; $R^2$ is any one of $C_3H_7(CH_2)_5$; $CH_3(CH_2)_7$; $CH_3(CH_2)_9$; $C_2H_5(CH_2)_7$; $CH_3(CH_2)_{11}$ or $CH_3(CH_2)_{12}$; and $R^3$ is any one of $C_3H_7(CH_2)_5$; $CH_3(CH_2)_7$; $CH_3(CH_2)_9$; $C_2H_5(CH_2)_7$; $CH_3(CH_2)_{11}$; $CH_3(CH_2)12$ or $C_4H_9.C_6H_{10}$; and wherein the cationic solvent is di-(2-ethylhexyl) phosphoric acid.

8. The process of claims 4, or 6 or 7, wherein organic phase modifiers are employed in the anionic solvent selected from the group consisting of isodecanol, tributyl phosphoric acid, tri-octyl phosphine oxide, tri-isobutyl phosphine sulfide and isobutyl methylketone.

9. The process of claims 4, or 6, or 7, wherein the pH of the zinc-loaded aqueous solution is controlled at about 2 to 6 prior to the extraction of zinc therefrom with said cationic solvent.

10. The process of claim 1, wherein the sulfuric acid solution used to strip the zinc from the zinc-loaded organic solvent has a concentration ranging from about 35 to 150 gpl $H_2SO_4$.

11. The process of claim 10, wherein the volume ratio of the zinc-loaded organic solvent to the sulfuric acid stripping solution is such that the concentration of zinc in the sulfuric acid following striping ranges from about 25 to 125 gpl.

12. A process for the recovery of substantially pure zinc from a zinc chloride-containing geothermal brine, said geothermal brine also containing recoverable amounts of base metals and precious metals which comprises:

mixing said geothermal brine with a substantially immiscible anionic organic solvent selective to the extraction of zinc to produce a spent geothermal brine, and a zinc-loaded anionic extractant,
said anionic solvent being dissolved in a diluent of a water-immiscible organic solvent,
separating said zinc-loaded anionic extractant from said spent geothermal brine,
subjecting said zinc-loaded anionic extractant to mixing with an aqueous solution to remove said zinc as zinc chloride,
separating said zinc chloride aqueous solution from said immiscible anionic extractant,
adjusting the pH of said zinc chloride aqueous solution, if necessary, to a level to condition the solution to promote the solution of said zinc by a cationic organic solvent,
extracting said zinc from said aqueous solution using a cationic organic solvent selective to the extraction of zinc, thereby producing a zinc-loaded cationic extractant,
said cationic solvent being dissolved in a diluent of a water-immiscible organic solvent,
separating said zinc-loaded cationic extractant from said aqueous solution;
stripping said zinc from said zinc-loaded cationic extractant using an amount of sulfuric acid by volume sufficient to provide an electrolyte solution containing a concentration of zinc as zinc sulfate sufficient for the recovery thereof by electrowinning, and
then electrowinning said zinc from said electrolyte to provide a product of substantially pure zinc.

13. The process of claim 12, wherein the anionic solvent is an organic solvent selected from the group consisting of secondary, tertiary and quaternary amines, and wherein said cationic organic solvent is selected from the group consisting of mono-(2-ethylhexyl) phosphoric acid, di-(2-ethylhexyl) phosphoric acid, mono-(2-ethylhexyl) phosphonic acid, di-(2-ethylhexyl) phosphonic acid, di-(2,4,4-trimethyl-pentyl) phosphinic acid, and di-(2-ethylhexyl) phosphinic acid.

14. The process of claim 13, wherein the anionic solvent is a secondary amine of the general formula $R^1R^2NH$ in which $R^1$ is any one of $C_3H_7;(CH_2)_5$; $CH_3(CH_2)_7$; $CH_3(CH_2)_9$; $C_2H_5(CH_2)_7$; $CH_3(CH_2)_{11}$; $CH_3(CH_2)12$ or $C_9H_{19}.C_3H_4$; $R^2$ is any one of $C_3H_7(CH_2)_5$; $CH_3(CH_2)_7$; $CH_3(CH_2)_9$; $C_2H_5(CH_2)_7$; $CH_3(CH_2)_{11}$ or $CH_3(CH_2)_{12}$; $C_4H_9.C_6H_{10}$ and Wherein the cationic solvent is di-(2-ethylhexyl) phosphoric acid.

15. The process of claim 13 wherein the anionic solvent is a tertiary amine of the general formula $R^1R^2R^3N$ in which $R^1$ is any one of $C_3H_7(CH_2)_5$; $CH_3(CH_2)_7$; $CH_3(CH_2)_9$; $C_2H_5(CH_2)_7$; $CH_3(CH_2)_{11}$ or $CH_3(CH_2)_{12}$; $C_9H_{19}.C_3H_4$; $R^2$ is any one of $C_3H_7(CH_2)_5$; $CH_3(CH_2)_7$; $CH_3(CH_2)_9$; $C_2H_5(CH_2)_7$; $CH_3(CH_2)_{11}$ or $CH_3(CH_2)_{12}$; and $R^3$ is any one of $C_3H_7(CH_2)_5$; $CH_3(CH_2)_7$; $CH_3(CH_2)_9$; $C_2H_5(CH_2)_7$; $CH_3(CH_2)_{11}$ or $CH_3(CH_2)_{12}$; and wherein the cationic solvent is di-(2-ethylhexyl) phosphoric acid.

16. The process of claims 13 or 14 or 15, wherein the organic solvents are diluted with a liquid selected from the group consisting of water-immiscible kerosene, aliphatic and aromatic solvents.

17. The process of claims 13 or 14 or 15 wherein organic phase modifiers are employed selected from the group consisting of isodecanol, tributyl phosphoric acid, trioctyl phosphine oxide, tri-isobutyl phosphine sulfide and isobutyl methylketone.

18. The process of claims 13 or 14 or 15, wherein the pH of the zinc-loaded aqueous solution is controlled at about 2 to 6 prior to the extraction of zinc therefrom with said cationic solvent.

19. The process of claim 12, wherein the sulfuric acid solution used to strip the zinc from the zinc-loaded cationic solvent has a concentration ranging from about 35 to 150 gpl $H_2SO_4$.

20. The process of claim 19, wherein the volume ratio of the zinc-loaded cationic solvent to the sulfuric acid stripping solution is such that the concentration of zinc in the sulfuric acid following stripping ranges from about 25 to 125 gpl.

21. The process of claim 19, wherein the concentration of sulfuric acid used to strip the zinc ranges from about 50 to 150 gpl.

22. A process for the recovery of substantially pure zinc from a reservoir of geothermal brine, said brine also containing recoverable amounts of lead and silver which comprises:

selectively extracting said lead and silver from said brine, mixing said brine impoverished in said lead and silver with a substantially immiscible anionic organic solvent selective to the extraction of zinc to produce a spent brine, and a zinc-loaded anionic extractant,
said anionic solvent being dissolved in a diluent of a water-immiscible organic solvent,
separating said zinc-loaded anionic extractant from said spent brine,
subjecting said zinc-loaded anionic extractant to mixing with an aqueous solution to remove said zinc as zinc chloride,
separating the zinc-loaded aqueous solution from said anionic extractant,
adjusting the pH of said zinc-containing aqueous solution, if necessary, to a level to condition the solution to promote the solution of said zinc by a cationic organic solvent,
extracting said zinc from said aqueous solution using a cationic organic solvent selective to the extraction of zinc, thereby producing a zinc loaded cationic extractant,
said cationic solvent being dissolved in a diluent of a water-immiscible organic solvent,
separating said zinc-loaded cationic extractant from said aqueous solution;
stripping said zinc from said zinc-loaded cationic extractant using an amount of sulfuric acid by volume sufficient to provide an electrolyte solution containing a concentration of zinc sufficient for the recovery thereof by electrowinning, and
then electrowinning said zinc from said electrolyte to provide a product of substantially pure zinc.

23. The process of claim 22, wherein said lead and silver are removed by cementation using a metal above lead and silver in the electro motive series.

24. The process of claim 23 wherein the cementation is carried out using a metal selected from the group consisting of zinc, iron and aluminum.

25. The process of claim 22, wherein the anionic solvent is an organic solvent selected from the group consisting of secondary, tertiary and quaternary amines, and wherein said cationic organic solvent is selected from the group consisting of mono-(2-ethylhexyl) phosphoric acid, di-(2-ethylhexyl) phosphoric acid, mono-(2-ethylhexyl) phosphonic acid, di-(2-ethylhexyl) phosphonic acid, di-(2,4,4-trimethyl-pentyl) phosphinic acid, and di-(2ethylhexyl) phosphinic acid.

26. The process of claim 22, wherein the anionic solvent is a secondary amine of the general formula $R^1R^2NH$ in which $R^1$ is any one of $C_3H_7(CH_2)_5$; $CH_3(CH_2)_7$; $CH_3(CH_2)_9$; $C_2H_5(CH_2)_7$; $CH_3(CH_2)_{11}$; $CH_3(CH_2)_{12}$ or $C_9H_{19}.C_3H_4$; $R^2$ is any one of $C_3H_7(CH_2)_5$; $CH_3(CH_2)_7$; $CH_3(CH_2)_9$; $C_2H_5(CH_2)_7$; $CH_3(CH_2)_{11}$ or $CH_3(CH_2)_{12}$; C4 wherein the cationic solvent is di-(2-ethylhexyl) phosphoric acid.

27. The process of claim 22, wherein the anionic solvent is a tertiary amine of the general formula $R^1R^2R^3N$ in which $R^1$ is any one of $C_3H_7(CH_2)_5$; $CH_3(CH_2)_7$; $CH_3(CH_2)_9$; $C_2H_5(CH_2)_7$; $CH_3(CH_2)_{11}$ or $CH_3(CH_2)_{12}$; $R^2$ is any one of $C_3H_7(CH_2)_5$; $CH_3(CH_2)_7$; $CH_3(CH_2)_9$; $C_2H_5(CH_2)_7$; $CH_3(CH_2)_{11}$ or $CH_3(CH_2)_{12}$; and $R^3$ is any one of $C_3H_7(CH_2)_5$; $CH_3(CH_2)_7$; $CH_3(CH_2)_9$; $C_2H_5(CH_2)_7$; $CH_3(CH_2)_{11}$ or $CH_3(CH_2)_{12}$; $C_4H_9.C_6H_{10}$; and wherein the cationic solvent is di-(2-ethylhexyl) phosphoric acid.

28. The process of claims 25 or 26 or 27, wherein the organic solvents are diluted with liquid selected from the group consisting of water-immiscible kerosene, aliphatic and aromatic solvents.

29. The process of claims 25 or 26 or 27, wherein organic phase modifiers are employed selected from the group consisting of isodecanol, tributyl phosphoric acid, trioctyl phosphine oxide, tri-isobutyl phosphine sulfide and isobutyl methylketone.

30. The process of claims 22 or 23 or 24 or 25, wherein the pH of the zinc-loaded aqueous solution is controlled at about 2 to 6 prior to the extraction of zinc therefrom with said cationic solvent.

31. The process of claim 22, wherein the sulfuric acid solution used to strip the zinc from the zinc-loaded cationic solvent has a concentration ranging from about 35 to 50 gpl $H_2SO_4$.

32. The process of claim 31, wherein the volume ratio of the zinc-loaded cationic solvent to the sulfuric acid stripping solution is such that the concentration of zinc in the sulfuric acid following stripping ranges from about 25 to 125 gpl.

33. The process of claim 31, wherein the concentration of sulfuric acid used to strip the zinc ranges from about 50 to 150 gpl.

34. A process for the recovery of substantially pure zinc from a reservoir of geothermal brine confined under pressure at elevated temperature at subterranean levels substantially below the earth surface, said brine also containing recoverable amounts of lead and silver which comprises:
tapping and bringing to the earth's surface a portion of said geothermal brine;
allowing said brine to flash at atmospheric pressure to produce steam for use in the generation of electrical power;
cooling said flashed brine to a temperature sufficient to enable the effective extraction of zinc from the brine by an anionic solvent;
extracting lead and silver from said brine by cementation by adding a metal selected from the group consisting of zinc, iron and aluminum to said cooled brine,
removing said cemented lead and silver from said brine by solid/liquid separation;
mixing said brine impoverished in said lead and silver with a substantially immiscible anionic solvent selective to the extraction of zinc to produce a spent brine and a zinc-loaded anionic extractant;
said anionic solvent being dissolved in a diluent of water-immiscible organic solvent,
recycling said spent brine to said reservoir of geothermal brine;
subjecting said zinc-loaded anionic extractant to mixing with an aqueous solution to produce a zinc-loaded aqueous zinc chloride solution,
separating the zinc-loaded aqueous solution from said anionic extractant,
adjusting the pH of said zinc-containing aqueous solution, if necessary, to a pH sufficient to promote the separation of said zinc by cationic extraction,
subjecting said zinc-loaded aqueous solution to extraction with a cationic solvent selective to zinc;
said cationic solvent being dissolved in a diluent of a water-immiscible organic solvent,
stripping said zinc from said loaded cationic extractant using a sulfuric acid electrolyte solution,
the volume ratio of the cationic solvent to the sulfuric acid solution being such as to provide a zinc electrolyte solution of zinc concentration sufficient for the recovery of zinc therefrom,
and then electrowinning said zinc from said electrolyte solution to provide a product of substantially pure zinc.

35. The process of claim 34, wherein the anionic solvent is selected from the group consisting of secondary, tertiary, or quaternary amines selective to the solvent extraction of zinc from said brine solution.

36. The process of claim 35, wherein said cationic organic solvent is selected from the group consisting of mono-(2-ethylhexyl) phosphoric acid, di-(2-ethylhexyl) phosphoric acid, mono-(2-ethylhexyl) phosphonic acid, di-(2ethylhexyl) phosphonic acid, di(2,4,4-trimethylpentyl) phosphinic acid, and di-(2-ethylhexyl) phosphinic acid.

37. The process of claim 32, wherein the anionic solvent is a secondary amine of the general formula $R^1R^2NH$ in which $R^1$ is $CH_9H_{19}CH=CH_3$, $CH_3H_7(CH_2)_{10}$; $CH_3(CH_2)_{11}$, $CH_3(CH_2)_{12}$ and $R^2$ is $CH_4H_{92}(CH_2)_4$, $CH_3H_7(CH_2)_{10}$, $CH_3(CH_2)_{11}$ and $CH_3(CH_2)_{12}$.

38. The process of claim 35, Wherein the anionic solvent is a tertiary amine of the general formula $R^1R^2R^3N$ wherein $R^1$ is any one of $C_3H_7(CH_2)_5$; $CH_3(CH_2)_7$; $CH_3(CH_2)_9$; $C_2H_5(CH_2)_7$; $CH_3(CH_2)_{11}$ or $CH_3(CH_2)_{12}$; $R^2$ is any one of $C_3H_7(CH_2)_5$; $CH_3(CH_2)_7$; $CH_3(CH_2)_9$; $C_2H_5(CH_2)_7$; $CH_3(CH_2)_{11}$ or $CH_3(CH_2)_{12}$; and $R^3$ is any one of $C_3H_7(CH_2)_5$; $CH_3(CH_2)_7$; $CH_3(CH_2)_9$; $C_2H_5(CH_2)_7$; $CH_3(CH_2)_{11}$ or $CH_3(CH_2)_{12}$.

39. The process of claim 35, wherein the anionic solvent is a quaternary amine of the general formula $R^1R^2R^3N.CH_3Cl$, wherein $R^1=R^2=R^3$ selected from the group consisting of $CH_3(CH_2)_7$, $CH_3(CH_2)_9$ and $CH_3(C_8H_{10})_3$.

40. The process of claims 37 or 38 or 39, wherein the cationic solvent is di-(2-ethylhexyl) phosphoric acid.

41. The process of claim 34, wherein the sulfuric acid solution used to strip the zinc from the zinc-loaded cationic solvent has a concentration ranging from about 35 to about 150 gpl $H_2SO_4$ and 0 to about 60 gpl zinc.

42. The process of claim 40, wherein the volume ratio of the zinc-loaded cationic solvent to the sulfuric acid stripping solution is such that the concentration of zinc in the sulfuric acid following stripping ranges from about 25 to 125 gpl.

43. The process of claim 41, wherein the concentration of sulfuric acid used to strip the zinc ranges from about 50 to 50 gpl.

44. The process of claim 41, wherein the sulfuric acid used to strip the zinc ranges from about 50 to 150 gpl and wherein the zinc concentration in the recovered stripping solution used for the electrolysis of zinc ranges from about 25 to 125 gpl.

45. The process of claim 34, wherein said zinc is recovered electrolytically using electrical power generated from the intrinsic heat of said geothermal brine.

46. A process for the recovery of substantially pure zinc from geothermal brine, said geothermal brine also containing recoverable amounts of lead and silver which comprises:

selectively extracting said lead and silver from said brine,
contacting said brine impoverished in said lead and silver with an organic ion exchange resin selective to the extraction of zinc to produce a spent brine, and a zinc-loaded organic resin,
selectively extracting said zinc from said ion exchange resin in the form of an aqueous solution of zinc chloride,
adjusting the pH of said zinc-containing aqueous solution, if necessary, to a level to condition the solution to promote the extraction of said zinc by a second organic extractant consisting essentially of a cationic organic solvent,
extracting said zinc from said aqueous solution using said cationic organic solvent selective to the extraction of zinc, thereby producing a zinc-loaded cationic extractant,
said cationic extractant being dissolved in a diluent of a water-immiscible organic solvent to enable the separation thereof from the aqueous solution,
separating said zinc-loaded cationic extractant from said aqueous solution;
stripping said zinc from said zinc-loaded cationic extractant using an amount of sulfuric acid by volume sufficient to provide an electrolyte solution containing a concentration of zinc sufficient for the recovery thereof by electrowinning, and
then electrowinning said zinc from said electrolyte to provide a product of substantially pure zinc.

47. The process of claim 46, wherein the ion exchange resin is a strong base anion exchanger.

48. The process of claim 46, wherein the cationic organic solvent is selected from the group consisting of mono-(2-ethylhexyl) phosphoric acid, di-(2-ethylhexyl) phosphoric acid, mono-(2-ethylhexyl) phosphonic acid, di-(2-ethylhexyl) phosphonic acid, di-(2,4,4-trimethylpentyl) phosphinic acid, and di-(2ethylhexyl) phosphinic acid.

49. The process of claim 48, wherein the cationic organic solvent is diluted with a liquid selected from the group consisting of water-immiscible kerosene, aliphatic and aromatic solvents.

50. The process of claim 47, wherein the pH of the zinc-loaded aqueous solution is controlled at about 2 to 6 prior to the extraction of zinc therefrom with said cationic solvent.

51. The process of claim 47, wherein the sulfuric acid solution used to strip the zinc from the zinc-loaded cationic solvent has a concentration ranging from about 35 to 50 gpl $H_2SO_4$.

52. The process of claim 51, wherein the volume ratio of the zinc-loaded cationic solvent to the sulfuric acid stripping solution is such that the concentration of zinc in the sulfuric acid following stripping ranges from about 25 to 125 gpl.

53. The process of claim 51, wherein the concentration of sulfuric acid used to strip the zinc ranges from about 50 to 50 gpl.

54. The process of claim 48, wherein said cationic organic solvent is di-(2-ethylhexyl) phosphoric acid.

* * * * *

UNITED STATES PATENT AND TRADEMARK OFFICE
CERTIFICATE OF CORRECTION

PATENT NO. : 5,229,003
DATED : July 20, 1993
INVENTOR(S) : Willem P.C. Duyvesteyn It is certified that error appears in the above-identified patent and that said Letters Patent is hereby corrected as shown below:

On the title page, item [54] and column 1, line 2, change "MATERIALS" to --METALS--.

Claim 31, column 16, line 15, "35 to 50 gpl" should be --35 to 150 gpl--;

Claim 43, column 17, line 50, "50 to 50 gpl" should be --50 to 150 gpl--;

Claim 51, column 18, line 51, "35 to 50 gpl" should be --35 to 150 gpl--; and

Claim 53, column 18, line 59, "50 to 50 gpl" should be 50 to 150 gpl--.

Signed and Sealed this

Fifteenth Day of February, 1994

*Attest:*

BRUCE LEHMAN

*Attesting Officer*    Commissioner of Patents and Trademarks